United States Patent
Abraham et al.

(10) Patent No.: US 8,440,783 B2
(45) Date of Patent: May 14, 2013

(54) ENHANCED OLIGOMERIC POLYOLS AND POLYMERS MADE THEREFROM

(75) Inventors: Timothy W. Abraham, Minnetonka, MN (US); Jeff Malsam, Minneapolis, MN (US); Xiuguang A. Guo, Northfield, IL (US); Milhail Ionescu, Pittsburg, KS (US); Ivan J. Javni, Pittsburg, KS (US); Zoran S. Petrovic, Pittsburg, KS (US)

(73) Assignee: Cargill, Incorporated, Wayzata, MN (US)

( * ) Notice: Subject to any disclaimer, the term of this patent is extended or adjusted under 35 U.S.C. 154(b) by 602 days.

(21) Appl. No.: 12/226,696

(22) PCT Filed: Apr. 27, 2007

(86) PCT No.: PCT/US2007/010252
§ 371 (c)(1), (2), (4) Date: May 7, 2010

(87) PCT Pub. No.: WO2007/127379
PCT Pub. Date: Nov. 8, 2007

(65) Prior Publication Data
US 2010/0217022 A1    Aug. 26, 2010

Related U.S. Application Data

(60) Provisional application No. 60/795,327, filed on Apr. 27, 2006, provisional application No. 60/859,337, filed on Nov. 16, 2006.

(51) Int. Cl.
*C08G 69/28*    (2006.01)
(52) U.S. Cl.
USPC ............ 528/350; 528/340; 528/44; 528/361

(58) Field of Classification Search ........................ None
See application file for complete search history.

(56) References Cited

U.S. PATENT DOCUMENTS

| | | | | | |
|---|---|---|---|---|---|
| 3,259,511 | A | * | 7/1966 | Rairdon et al. | 106/263 |
| 4,742,087 | A | * | 5/1988 | Kluth et al. | 521/107 |
| 5,681,971 | A | * | 10/1997 | Scheibel et al. | 554/69 |
| 2006/0041157 | A1 | * | 2/2006 | Petrovic et al. | 554/149 |

FOREIGN PATENT DOCUMENTS

| | | | |
|---|---|---|---|
| EP | 0256355 | * | 2/1988 |
| EP | 0554590 | * | 8/1993 |

OTHER PUBLICATIONS

EP 0554590 (A2), Hellbardt et al., Process for the preparationof comounds of hydroxylated fatty acids, 1993, English translation, 8 pages.*

* cited by examiner

*Primary Examiner* — Yate K Cutliff

(57) ABSTRACT

Enhanced oligomeric polyols are reported. The enhanced oligomeric polyols may be prepared by a method comprising the steps of: (a) providing an oligomeric polyol that comprises at least one glycerol fatty acid ester having at least one glycerol fatty acid ester bond; wherein at least 5% of the ethyldenyl groups (*C═C*) in the glycerol fatty acid ester are substituted with a bonding structure selected from the group consisting of: C-*C—C*-C; O-*C—C*-O; C=*C—C*-C, and mixtures thereof, where * is used to denote the original carbon atoms in the ethylidenyl group; and (b) cleaving at least a portion of the glycerol fatty acid ester bonds to form the enhanced oligomeric polyol. The enhanced oligomeric polyols are useful in making polymers such as polyurethanes.

12 Claims, No Drawings

ENHANCED OLIGOMERIC POLYOLS AND POLYMERS MADE THEREFROM

CROSS-REFERENCE TO RELATED APPLICATIONS

This application claims priority to U.S. Ser. No. 60/795,327 entitled "Enhanced Oligomeric Polyols", filed Apr. 27, 2006, and to U.S. Ser. No. 60/859,337, entitled "Viscoelastic Polyurethane Foams Comprising Amidated or Transesterified Oligomeric Natural Oil Polyols", filed Nov. 16, 2006, the disclosures of which are incorporated herein by reference.

BACKGROUND

Petroleum-derived polyols have been widely used in the manufacturing of polyurethane foams. Recently, however, there has been an increased interest in the use of renewable resources in the manufacturing of polymers such as polyurethanes. This has led to research into developing natural oil-based polyols that are suitable as full or as partial replacements for petroleum-derived polyols in polymers such as polyurethanes.

One method of making a polyol from an unsaturated natural oil is to epoxidize the natural oil, followed by ring-opening of at least a portion of the epoxide groups to form pendant secondary hydroxyl groups. Ring-opening may be accomplished, for example, by reacting the epoxidized natural oil with a alcohol (e.g., methanol) in the presence of a catalyst (e.g., $HBF_4$). This synthetic route results primarily in the formation of secondary hydroxyl groups that are pendant from the natural oil. Although pendant secondary hydroxyl groups are useful in forming polyurethanes, it is desirable to provide natural oil-based polyols that have faster reactivity due to the presence of at least some primary hydroxyl groups in the polyol.

SUMMARY

The present invention relates to enhanced oligomeric polyols that are prepared from natural oils. The natural oil polyols may be used to make polymers such as polyurethanes, polyesters, polycarbonates, and the like. In exemplary embodiments, the natural oil polyol are useful in polyurethane polymers, such as polyurethane foams.

In some embodiments of the invention, the enhanced oligomeric polyols are prepared by a method comprising the steps of
  (a) providing an oligomeric polyol that comprises at least one glycerol fatty acid ester having at least one glycerol fatty acid ester bond; wherein at least 5% of the ethylidenyl groups (*C=C*) in the glycerol fatty acid ester are substituted with a bonding structure selected from the group consisting of C-*C—C*-C; O-*C—C*-O; C=*C—C*-C, and mixtures thereof, where * is used to denote the original carbon atoms in the ethylidenyl group; and
  (b) cleaving at least a portion of the glycerol fatty acid ester bonds to form the enhanced oligomeric polyol.

Examples of natural oils that may be useful as starting materials include plant-based oils (e.g., vegetable oils) and animal fats. Examples of plant-based oils include soybean oil, safflower oil, linseed oil, corn oil, sunflower oil, olive oil, canola oil, sesame oil, cottonseed oil, palm oil, rapeseed oil, tung oil, peanut oil, castor oil, jatropha oil, and combinations thereof. Examples of animal fats include fish oil, lard, and tallow.

In exemplary embodiments, the oligomerization of the natural oil may be accomplished by chemical oligomerization (e.g., epoxidation and ring opening oligomerization) or by anaerobic thermal oligomerization (e.g., anaerobic heating to form a bodied oil). After oligomerization, at least a portion of the glycerol fatty acid ester bonds in the oligomeric natural oil are cleaved to form an enhanced polyol of the invention. Cleaving at least a portion of the glycerol fatty acid ester bonds functions to introduce additional functionality (i.e., to "enhance" the functionality of the oligomeric fatty acid ester) into the oligomeric fatty acid ester. For example, in many embodiments, the cleaving reaction introduces primary hydroxyl functionality into the enhanced oligomeric polyols.

Representative examples of cleaving reactions include reacting the oligomeric natural oil with a nucleophile. Common nucleophilic cleaving reactions include amidation and transesterification.

Amidation involves reacting the oligomeric natural oil with an amine (e.g., a polyamine such as a diamine) or an alkanolamine (eg. ethanolamine). During amidation, at least a portion of the amine groups that are present in the polyamine react with at least a portion of the ester groups that are present in the oligomeric natural oil resulting in the formation of amide groups and hydroxyl groups.

Transesterification involves reacting the oligomeric natural oil with a polyol (e.g., diol) compound. During transesterification, at least a portion of the ester groups that are present in the polyol compound react with at least a portion of the ester groups that are present in the oligomeric natural oil resulting in the formation of ester groups and hydroxyl groups.

Throughout the application, the following terms will have the following meanings.

As used herein "polyol" refers to a molecule that has an average of greater than 1.0 hydroxyl groups per molecule. It may optionally include other functionalities.

As used herein "anaerobic thermal oligomerization" refers to the process of oligomerizing a fatty acid ester (e.g., natural oil) by the application of heat under substantially anaerobic conditions.

As used herein "chemical oligomerization" refers to the process of oligomerizing a fatty acid ester (e.g., natural oil) by a chemical process that includes creating cross-links between fatty acid chains by functionalizing (e.g., epoxidizing) at least a portion of the double bonds in the fatty acid ester and reacting (e.g., ring-opening) at least a portion of the functional groups to create cross-links.

As used herein "natural oil" means a plant-based oil (i.e., a vegetable oil) or an animal fat.

As used herein "oligomer" refers to two or more glyceride-based fatty acid ester monomer units that have been covalently bonded to one another by an oligomerizing reaction. Oligomers include dimers, trimers, tetramers, and higher order oligomers. The term "oligomerized" refers to a material that comprises oligomers.

DETAILED DESCRIPTION

The invention relates to polyols that are derived from natural oils, such as vegetable oils or animal fats.

In order to make the enhanced oligomeric polyol, a starting composition comprising a natural oil is oligomerized by an oligomerization method such as chemical oligomerization or anaerobic thermal oligomerization. After oligomerization, at least a portion of the glycerol fatty acid ester bonds in the oligomerized fatty acid ester are cleaved in order to introduce additional functionality into the polyol. Cleaving the fatty acid ester bonds may be accomplished, for example, by reaction with a nucleophile. Common nucleophilic reactions include amidation and transesterification. Representative examples of enhanced oligomeric polyols include: (a) amidated anaerobically thermally oligomerized polyols; (b) amidated chemically oligomerized polyols; (c) transesterified anaerobically thermally oligomerized polyols; and (d) transesterified chemically oligomerized polyols.

In some embodiments, the enhanced oligomeric polyols are prepared by amidating an anaerobically thermally oligomerized natural oil. Such polyols may be made by a process comprising the steps of: (a) providing a natural oil; (b) anaerobically heating the natural oil so that it oligomerizes to form an anaerobically thermally oligomerized natural oil; and (c) amidating the anaerobically thermally oligomerized natural oil to form the enhanced oligomeric polyol.

In other embodiments, the enhanced oligomeric polyols are prepared by amidating a chemically oligomerized natural oil. Such polyols may be made by a process comprising the steps of (a) providing a natural oil; (b) chemically oligomerizing the natural oil so that it oligomerizes to form a chemically oligomerized natural oil; and (c) amidating the chemically oligomerized natural oil to form the enhanced oligomeric polyol.

In yet other embodiments, the enhanced oligomeric polyols are prepared by transesterification of an anaerobically thermally oligomerized natural oil. Such polyols may be made by a process comprising the steps of (a) providing a natural oil; (b) anaerobically heating the natural oil so that it oligomerizes to form an anaerobically thermally oligomerized natural oil; and (c) transesterifying the anaerobically thermally oligomerized natural oil to form the enhanced oligomeric polyol.

In yet other embodiments, the enhanced oligomeric polyols are prepared by transesterification of a chemically oligomerized natural oil. Such a polyol may be made by a process comprising the steps of: (a) providing a natural oil; (b) chemically oligomerizing the natural oil so that it oligomerizes to form a chemically oligomerized natural oil; and (c) transesterifying the chemically oligomerized natural oil to form the enhanced oligomeric polyol.

Additional details of making the enhanced oligomeric polyols will now be described.

Starting Materials (Natural Oil)

Useful natural oil starting materials for the polyols of the invention include plant-based oils (e.g., vegetable oils) and animal fats. Examples of plant-based oils include soybean oil, safflower oil, linseed oil, corn oil, sunflower oil, olive oil, canola oil, sesame oil, cottonseed oil, palm oil, rapeseed oil, tung oil, peanut oil, castor oil, jatropha oil, and combinations thereof Examples of animal fats include fish oil, lard, and tallow. Also useful are partially hydrogenated vegetable oils and genetically modified vegetable oils, including high oleic safflower oil, high oleic soybean oil, high oleic peanut oil, high oleic sunflower oil, and high erucic rapeseed oil (crambe oil). These oils may be either crude or refined oils.

The number of double bonds per molecule in a natural oil may be quantified by the iodine value (IV) of the oil. For example, a vegetable oil having one double bond per molecule corresponds to an iodine value of about 28. Soybean oil typically has about 4.6 double bonds/molecule and has an iodine value of about 120 to about 140. Canola oil typically has about 4.1 double bonds/molecule and has an iodine value of about 115. Typically, iodine values for the vegetable oils will range from about 40 to about 240. In some embodiments, vegetable oils having an iodine value greater than about 80, greater than about 100, or greater than about 110 are used. In some embodiments, vegetable oils having an iodine value less than about 240, less than about 200, or less than about 180 are used.

Useful natural oils typically comprise glycerides (e.g., mono, di, and triglycerides) of fatty acids that contain glycerol fatty acid ester bonds, which link the fatty acids to the glycerol molecule in the glyceride. The fatty acids may be saturated fatty acids or unsaturated fatty acids which may contain fatty acid chain lengths that typically range from about 12 carbons (i.e. C12) to about 24 carbons (i.e., C24). Unsaturated fatty acids include monounsaturated and polyunsaturated fatty acids. Common saturated fatty acids include lauric acid (dodecanoic acid), myristic acid (tetradecanoic acid), palmitic acid (hexadecanoic acid), stearic acid (octadecanoic acid), arachidic acid (eicosanoic acid), and lignoceric acid (tetracosanoic acid). Common monounsaturated fatty acids include palmitoleic (a C16 unsaturated acid) and oleic (a C18 unsaturated acid). Common polyunsaturated fatty acids include linoleic acid (a C18 di-unsaturated acid), linolenic acid (a C18 tri-unsaturated acid), and arachidonic acid (a C20 tetra-unsaturated acid). The triglyceride oils comprise fatty acids esters of glycerol where the fatty acids are randomly distributed on the three sites of the trifunctional glycerol molecule. Different triglyceride oils will have different ratios and distributions of fatty acids. The ratio of fatty acid for a given triglyceride oil will also vary depending upon such factors, for example, as where the crop is grown, maturity of the crop, weather during the growing season, etc. Because of this it is difficult to provide a specific or unique composition for any given triglyceride oil, rather the composition is typically reported as a statistical average. For example, soybean oil contains a mixture of palmitic, stearic acid, oleic acid, linoleic acid, and linolenic acid in the ratio of about 4:11:24:53:8. This translates into an average molecular weight of about 800 to 880 Da, an average number of double bonds of about 4.4 to about 4.7 per triglyceride, and an iodine value of about 120 to about 140.

Also useful are functionalized glycerol fatty acid esters. One of ordinary skill in the art will appreciate that there are many methods of functionalizing glycerol fatty acid esters. For example functionalized glycerol fatty acid esters may include hydroformylated oils (see, WO2005033167A2 Herrington et al.) which can function as an alcohol during oligomerization of glycerol fatty acid esters, epoxidized oils (such as "FLEXOL" from Union Carbide), and partially epoxidized oils (including for example those described in WO2005033167A2 Herrington et al.), unsaturated oils, polyunsaturated oils, epoxidized oils that have been partially or fully ring-opened with a nucleophile (e.g., partially or fully epoxidized vegetable oil reacted with MeOH in the presence of an acid catalyst).

Methods of Oligomerization

A variety of known oligomerization method may be used to form an oligomeric fatty acid ester useful in the present invention. Typically, the process of making oligomeric fatty acid esters from fatty acid ester compositions includes the use of a chemical compound, an energy source, or a combination thereof. Representative examples of oligomerization methods include:

(a) thermal oligomerization of a fatty acid ester at elevated temperatures under anaerobic conditions to generate a bodied oil;

(b) ring-opening oligomerization of an epoxidized fatty acid ester with an alcohol such as a monoalcohol or a polyol (see, e.g., U.S. Patent Publication No. 2006/0041157A);

(c) cationically catalyzed ring-opening polymerization of an epoxidized fatty acid ester (see, e.g., U.S. Patent Publication No. 2006/0041157A);

(d) oligomerization of a fatty acid ester in the presence of a Brönsted or Lewis acid catalyst (see, U.S. Pat. Nos. 2,160,572 and 2,365,919);

(e) crosslinking with a sulfur compound; and (f) crosslinking a hydroxyl-functional fatty acid ester with a hydroxyl-reactive crosslinking agent, for example, a diisocyanate (e.g., toluene diisocyanate), diacid, diester, bis-(2-chloroethylsulfone), bis-(2-chloroethyl)sulfoxide, bis-(2-chloroethyl)ether, 1,3-butadienediepoxide, epoxidized vegetable oil, and mixtures thereof.

Typically, oligomerization of the fatty acid ester is the result of the creation of crosslinks at the sites of ethylidenyl groups in the fatty acid chains of the fatty acid esters. The crosslinks typically form between at least one of the carbons forming the ethylidenyl group and (a) a fatty acid ester on the same glycerol backbone (intracrosslink); (b) a fatty acid ester on a different glycerol fatty acid ester molecule (intercrosslink); (c) a polyfunctional crosslinking agent (e.g., a petrochemical or biologically derived polyol); and (d) combinations of (a), (b), and (c). After a crosslink is formed, the two carbon atoms that formed the ethylidenyl group in the fatty acid ester no longer will share a carbon-carbon double bond. Typically, these two carbon atoms will either both be bound to an oxygen, or they will individually form new carbon-carbon bonds (e.g., carbon-carbon single bonds or carbon-carbon double bonds).

In some embodiments of the invention, the oligomeric fatty acid ester comprises at least one glycerol fatty acid ester having at least one glycerol fatty acid ester bond; and at least 5% of the ethylidenyl groups (*C=C*) in the glycerol fatty. acid ester are substituted with a bonding structure selected from the group consisting of C-*C—C*-C; O-*C—C*-O; C=*C—C*-C, and mixtures thereof. In the structures shown, * is used to denote the position of an original carbon atom in the ethylidenyl group in the bonding structure. In some embodiments, at least about 10%, 12%, 14%, 16%, 20%, 25%, 30%, 35%, or 40% or greater of the ethylidenyl groups (*C=C*) in the glycerol fatty acid ester are substituted with a bonding structure selected from the group consisting of C-*C—C*-C; O-*C—C*-O; C=*C—C*-C; and mixtures thereof.

Thermal Oligomerization

In some embodiments, the natural oil comprising fatty acid esters are thermally oligomerized under anaerobic conditions to form an oligomeric fatty acid ester. Natural oils thermally oligomerized under anaerobic conditions are referred to as bodied oils. By anaerobic conditions it is meant that the fatty acid ester is oligomerized in the absence of a substantial amount of molecular oxygen or air. Anaerobic heating is typically conducted in a vacuum or in an atmosphere of an inert gas. In many embodiments, nitrogen gas is used as the inert gas. A steam sparge may also be used. The use of anaerobic conditions substantially reduces or prevents the formation of hydroperoxides and/or aldehydes in the oligomerized fatty acid ester.

During anaerobic thermal oligomerization, the carbon-carbon double bonds that are present in the fatty acid portions of the natural oil react with one another to form crosslinks. The crosslinks may be intramolecular (i.e., between fatty acids esterified to the same glycerol molecule) or intermolecular (i.e., between fatty acids esterified to different glycerol molecules). Intermolecular crosslinks result in the formation of oligomers in the thermally oligomerized natural oil, for example, dimers, trimers, tetramers, and higher order oligomers. Cyclic intercrosslinks and intracrosslinks may also be formed as the result of Diels-Alder reactions.

In order to oligomerize the fatty acid ester, it is heated in an anaerobic atmosphere until it reaches the desired degree of oligomerization. For example, the natural oil may be heated at a temperature of between about 100° C. to about 400° C. for a time ranging from about 2 hours to about 24 hours. The temperature and time used will depend on the type of fatty acids that are present in the natural oil and the desired extent of oligomerization.

Heat bodied oils are synthesized by subjecting a natural oil (e.g., linseed oil or soybean oil) to high temperatures (e.g., 200° C. to 400° C.) under anaerobic conditions for several hours. In some embodiments, a catalyst (e.g., acids or metallic catalysts) is used to accelerate the oligomerization reaction. Temperatures greater than about 300° C. are typically employed, but oligomerization of the natural oils can also begin to occur even at lower temperatures, especially with the use of catalysts. In many embodiments, the bodying reaction is run under reduced pressure to remove volatiles that are formed during the reaction. The volatiles are sometimes removed by sparging the oil with nitrogen or steam during the reaction. It is important to prevent any air leaking into the system, which will result in rapid oxidation and degradation of the oil resulting in the formation of high levels of odoriferous compounds, such as aldehydes. The extent of oligomerization can be determined, for example, by measuring the increase in viscosity of the natural oil.

In some embodiments, the thermally oligomerized fatty acid ester will contain residual double bonds. That is, in some embodiments, not all of the double bonds react when the fatty acid ester is oligomerized to form the thermally oligomerized fatty acid ester. The amount of double bonds can be determined by measuring the iodine value of the thermally oligomerized fatty acid ester. The iodine value (IV) for a compound is the amount of iodine that reacts with a sample of a substance, expressed in centigrams iodine ($I_2$) per gram of substance (cg $I_2$/gram). The IV of the thermally oligomerized natural oil will typically depend on the IV of the starting natural oil, and also the extent to which the natural oil is oligomerized. For soybean oil, it is typical for the IV to start at about 125-130 and to reach about 90 after thermal oligomerization.

Additional details pertaining to thermally oligomerized natural oils may be found, for example, in the following publications:

(a) Shiina, Hisako. *Yukagaku* 1982, Volume 31(7): 421-425;

(b) Rhoades, W. F.; Da Valle, A. J. *Journal of the American Oil Chemists' Society* (1951), 28, 466-468;

(c) Radlove, S. B.; Falkenburg, L. B. *Journal of the American Oil Chemists' Society* (1948), 25, 1-3;

(d) Wang, Chaohua; Erhan, Sevim, *Journal of the American Oil Chemists' Society* (1999), 76(10), 1211-1216; and (e) Erhan, S. Z.; Bagby, M. O. *Journal of the American Oil Chemists' Society* (1994), 71(11), 1223-6.

Chemical Oligomerization

In some embodiments the natural oil is chemically oligomerized. Any known method may be used to chemically oligomerize the natural oil. In an exemplary method, oligomerization of a fully or partially epoxidized natural oil is achieved by ring-opening oligomerization, for example, as reported in U.S. Patent Application No. 2006/0041157A1; and in PCT Publication Nos. WO2006/012344A1 and WO2006/116456. Ring-opening oligomerization may be conducted by reacting an epoxidized natural oil with a ring-opener in the presence of a ring-opening acid catalyst. The components are described in more detail below.

The epoxidized natural oils may be partially or fully epoxidized. Partially epoxidized natural oil may include at least about 10%, at least about 20%, at least about 25%, at least about 30%, at least about 35%, at least about 40% or more of the original amount of double bonds present in the oil. The partially epoxidized natural oil may include up to about 90%, up to about 80%, up to about 75%, up to about 70%, up to about 65%, up to about 60%, or fewer of the original amount of double bonds present in the oil. Fully epoxidized natural oil may include up to about 10%, up to about 5%, up to about 2%, up to about 1%, or fewer of the original amount of double bonds present in the oil.

A partially epoxidized or fully epoxidized natural oil may be prepared by a method that comprises reacting a natural oil with a peroxyacid under conditions that convert a portion of or all of the double bonds of the oil to epoxide groups.

Examples of peroxyacids include peroxyformic acid, peroxyacetic acid, trifluoroperoxyacetic acid, benzyloxyperoxyformic acid, 3,5-dinitroperoxybenzoic acid, m-chloroperoxybenzoic acid, and combinations thereof. In some embodiments, peroxyformic acid or peroxyacetic acid are used. The peroxyacids may be added directly to the reaction mixture, or they may be formed in-situ by reacting a hydroperoxide with a corresponding acid such as formic acid, benzoic acid, fatty acids (e.g., oleic acid), or acetic acid. Examples of hydroperoxides that may be used include hydrogen peroxide, tert-butylhydroperoxide, triphenylsilylhydroperoxide, cumylhydroperoxide, and combinations thereof. In an exemplary embodiment, hydrogen peroxide is used. Typically, the amount of acid used to form the peroxyacid ranges from about 0.25 to about 1.0 moles of acid per mole of double bonds in the vegetable oil, more typically ranging from about 0.45 to about 0.55 moles of acid per mole of double bonds in the vegetable oil. Typically, the amount of hydroperoxide used to form the peroxy acid is about 0.5 to about 1.5 moles of hydroperoxide per mole of double bonds in the vegetable oil, more typically about 0.8 to about 1.2 moles of hydroperoxide per mole of double bonds in the vegetable oil.

Typically, an additional acid component is also present in the reaction mixture. Examples of such additional acids include sulfuric acid, toluenesulfonic acid, trifluoroacetic acid, fluoroboric acid, Lewis acids, acidic clays, or acidic ion exchange resins.

Optionally, a solvent may be added to the reaction. Useful solvents include chemically inert solvents, for example, aprotic solvents. These solvents do not include a nucleophile and are non-reactive with acids. Hydrophobic solvents, such as aromatic and aliphatic hydrocarbons, are particularly desirable. Representative examples of suitable solvents include benzene, toluene, xylene, hexane, isohexane, pentane, heptane, and chlorinated solvents (e.g., carbon tetrachloride). In an exemplary embodiment, toluene is used as the solvent. Solvents may be used to reduce the speed of reaction or to reduce the number of side reactions. In general, a solvent also acts as a viscosity reducer for the resulting composition.

Subsequent to the epoxidation reaction, the reaction product may be neutralized. A neutralizing agent may be added to neutralize any remaining acidic components in the reaction product. Suitable neutralizing agents include weak bases, metal bicarbonates, or ion-exchange resins. Examples of neutralizing agents that may be used include ammonia, calcium carbonate, sodium bicarbonate, magnesium carbonate, amines, and resins, as well as aqueous solutions of neutralizing agents. Typically, the neutralizing agent will be an anionic ion-exchange resin. One example of a suitable weakly-basic ion-exchange resin is sold under the trade designation "LEWATIT MP-64" (from Bayer). If a solid neutralizing agent (e.g., ion-exchange resin) is used, the solid neutralizing agent may be removed from the epoxidized vegetable oil by filtration. Alternatively, the reaction mixture may be neutralized by passing the mixture through a neutralization bed containing a resin or other materials. Alternatively, the reaction product may be repeatedly washed to separate and remove the acidic components from the product. In addition, one or more of the processes may be combined in neutralizing the reaction product. For example, the product could be washed, neutralized with a resin material, and then filtered.

Subsequent to the epoxidation reaction, excess solvents may be removed from the reaction product (i.e., fully epoxidized vegetable oil). The excess solvents include products given off by the reaction, or those added to the reaction. The excess solvents may be removed by separation, vacuum, or other method. Preferably, the excess solvent removal will be accomplished by exposure to vacuum.

Useful fully-epoxidized soybean oils include those commercially available under the trade designations EPDXOL 7-4 (from American Chemical Systems) and FLEXOL ESO (from Dow Chemical Co.).

In many embodiments a ring-opening catalyst is used. In some embodiments, the acid catalyst is fluoroboric acid ($HBF_4$). The acid catalyst is typically present in an amount ranging from about 0.01% to about 0.3% by weight, more typically ranging from about 0.05% to about 0.15% by weight based upon the total weight of the reaction mixture.

Also included in the reaction mixture is a ring-opener. Various ring-openers may be used including alcohols, water (including residual amounts of water), and other compounds having one or more nucleophillic groups. Combinations of ring-openers may be used. In some embodiments, the ring-opener is a monohydric alcohol. Representative examples include methanol, ethanol, propanol (including n-propanol and isopropanol), and butanol (including n-butanol and isobutanol), and monoalkyl ethers of ethylene glycol (e.g., methyl cellosolve, butyl cellosolve, and the like). In an exemplary embodiment, the alcohol is methanol. In some embodiments, the ring-opener is a polyol. When the resulting polyol is to be used in flexible polyurethane foams, it is generally preferred to use polyols having about 2 or less hydroxyl groups per molecule. Examples of polyol ring-openers include ethylene glycol, propylene glycol, 1,3-propanediol, butylene glycol, 1,4-butanediol, 1,5-pentanediol, 1,6-hexanediol, polyethylene glycol, and polypropylene glycol. Also useful are vegetable oil-based polyols.

The ring-opening reaction is conducted with a ratio of ring-opener to epoxide that is less than stoichiometric in order to promote oligomerization of the epoxidized natural oil. In an exemplary embodiment, epoxidized soybean oil (ESBO) is reacted with methanol in the presence of a ring-opening catalyst, for example, fluoroboric acid. Typically, the molar ratio of methanol to fully epoxidized soybean oil will range from about 0.5 to about 3.0, more typically ranging from about 1.0 to about 2.0. In an exemplary embodiment, the molar ratio of the methanol to the epoxidized soybean oil ranges from about 1.3 to about 1.5.

Typically, at the start of the reaction, the fully epoxidized soybean oil has an epoxide oxygen content (EOC) ranging from about 6.8% to about 7.4%. The ring-opening reaction is preferably stopped before all of the epoxide rings are ring-opened. For some ring-opening catalyst, the activity of the catalyst decreases over time during the ring-opening reaction. Therefore, the ring-opening catalyst may be added to the reactive mixture at a controlled rate such that the reaction stops at (or near) the desired endpoint EOC. The ring-opening reaction may be monitored using known techniques, for example, hydroxyl number titration (ASTM E1899-02) or EOC titration (ROCS Cd9-57 method).

Typically, when fully epoxidized soybean oil is used, the ring-opening reaction is stopped when the residual epoxy oxygen content (EOC) ranges from 30, about 0.01% to about 6.0%, for example, about 0.5% to about 5.5%, about 1% to about 5.0%, about 2% to about 4.8%, about 3% to about 4.6%, or about 4.0% to about 4.5%. When other epoxidized natural oils are used, the residual epoxy oxygen content (EOC) of the polyol may be different. For example, for palm oil, the residual EOC may range from about 0.01% to about 3.5%, for example, about 0.2% to about 3.0%, about 0.5% to about 2.0%, or about 0.8% to about 1.5%. As used herein "epoxy oxygen content" or "EOC" refers to the weight of epoxide oxygen in a molecule expressed as percentage.

During the ring-opening reaction, some of the hydroxyl groups of the ring-opened polyol react with epoxide groups that are present on other molecules in the reactive mixture (e.g., molecules of unreacted fully epoxidized soybean oil or molecules of polyol having unreacted epoxide groups) resulting in oligomerization (i.e., the formation of dimers, trimers, tetramers, and higher order oligomers). The degree of oligomerization contributes to the desired properties of the oligomerized natural oil. In some embodiments, the oligomerized natural oil comprises about 40% weight or greater oligomers (including dimers, trimers, and higher order oligomers). In some embodiments, the oligomeric polyol comprises about 35% to about 45% weight monomeric polyol and about 55% to about 65% weight oligomers (e.g., dimers, trimers, tetramers, and higher order oligomers). For example, in some embodiments, the oligomerized natural oil comprises about 35% to about 45% weight monomeric polyol, about 8% to about 12% weight dimerized polyol, about 5% to about 10% weight trimerized polyol, and about 35% weight or greater of higher order oligomers.

Oligomerization may be controlled, for example, by catalyst concentration, reactant stoichiometry, and degree of agitation during ring-opening. Oligomerization tends to occur to a greater extent, for example, with higher concentrations of catalyst or with lower concentration of ring-opener (e.g., methanol). Upon completion of the ring-opening reaction, any unreacted methanol is typically removed, for example, by vacuum distillation. Unreacted methanol is not desirable because it is a monofunctional species that will end-cap the polyisocyanate during the polyurethane forming reaction. After removing any excess methanol, the resulting polyol is typically filtered, for example, using a 50 micron bag filter in order to remove any solid impurities.

In addition to epoxidation and ring-opening, chemical oligomerization may also be achieved by oligomerizing a natural oil in the presence of a Bronsted or Lewis acid catalyst as described, for example, in U.S. Pat. Nos. 2,160,572 and 2,365,919. Another technique for chemical oligomerization involves cationically catalyzed ring-opening of an epoxidized fatty acid ester. Oligomerization by this method is described, for example, in U.S. Patent Application Publication 2006/0041157A1.

Properties of Oligomeric Fatty Acid Esters

Generally, oligomeric fatty acid esters comprise intercrosslinks, which may be either direct crosslinks between two carbon atoms or through a crosslinking agent. When two glycerol fatty acid ester molecules are bound via an intercrosslink formed between two fatty acid molecules it may be described as a "dimer". Similarly, when three distinct glycerol fatty acid ester molecules are bound via intercrosslinks it may be described as a "trimer". When four distinct glycerol fatty acid ester molecules are bound via intercrosslinks it may be described as a "tetramer." Higher oligomers may also be formed depending on the number of distinct glycerol fatty acid ester molecules that are bound by intercrosslinks. In some embodiments the oligomeric fatty acid ester will comprise dimers, trimers, as well as higher oligomers. The oligomeric fatty acid ester can be further processed to separate out a desired species of oligomer, for instance to separate the dimers by known fractionation methods, such that a substantially homogenous oligomeric fatty acid ester product is formed. Examples of fractionation methods include solvent fractionation and chromatography.

In some embodiments, the oligomeric fatty acid ester has a peroxide value (PV) that is about 50 or less. Peroxide value may be measured, for example, using AOCS Cd 8b-90. In other embodiments, the peroxide value is about 40 or less, or about 30 or less, or about 20 or less, or about 10 or less.

In some embodiments, the oligomeric fatty acid ester has residual epoxide groups. In some embodiments, the oligomeric fatty acid ester has residual olefin groups. In some embodiments, the oligomeric fatty acid ester has both residual epoxide groups and residual olefin groups. Useful ranges for residual epoxide or olefin groups will vary depending on the type of natural oil used, the extent of epoxidation of the natural oil, and the final use of the enhanced oligomeric polyol. Typically, residual double bonds (due to only partial epoxidation of the vegetable oil) may range from about 0 to about 75% of the starting double bonds in the vegetable oil, and residual epoxide content can range from about 0 to about 6.0 EOC %. Unsaturation may be measured by iodine value (IV), for example, using the method reported in AOCS Cd 1-25 method. EOC % can be measured using the method reported in AOCS Cd 9-57.

One of ordinary skill in the art will appreciate that physical characteristics of the oligomeric fatty acid ester will depend upon the process used to make it. In some embodiments, the oligomeric fatty acid ester includes at least about 40% weight oligomers (oligomer herein meaning greater than a single glycerol fatty acid ester, for example a dimer). In some embodiments, the oligomeric fatty acid ester includes at least about 50% weight oligomers (e.g., based on integration of the peaks in a GPC). In general, the unsaturated or saturated oligomeric polyols may have a range of desired characteristics depending upon various parameters including the components used, the reaction time, the reaction temperature, and the concentration of the ring opener.

In some embodiments, the oligomeric fatty acid ester has a number average molecular weight (Mn) that is greater than about 1000 Da (e.g., based on integration of the peaks in a GPC). In other embodiments, the oligomeric fatty acid ester has a number average molecular weight (Mn) that ranges from about 1500 to about 6000 Da. Typically, the oligomeric fatty acid ester has a weight average molecular weight ranging from about 2000 Da to about 20,000 Da.

In general, the polydispersity (Mw/Mn) of the oligomeric fatty acid ester ranges from about 1 to about 15, more typically about 1 to about 6.

In some embodiments the oligomeric fatty acid ester has hydroxyl functionality. In these embodiments, the hydroxyl equivalent weight typically ranges from about 500 to about 2000, determined from the number average molecular weight and number average functionality. (In general, the resulting oligomeric polyols will have a hydroxyl number from about 10 mg KOH/g to about 300 mg KOH/g. Preferably, the oligomeric polyol will have a hydroxyl number at least about 20 mg KOH/g or higher, or at least about 30 mg KOH/g or higher, or at least about 40 mg KOH/g or higher, or at least about 50 mg KOH/g or higher. Preferably, the oligomeric polyol will have a hydroxyl number about 200 mg KOH/g or lower, or about 180 mg KOH/g or lower, or about 150 mg KOH/g or lower, or about 100 mg KOH/g or lower, or about 80 mg KOH/g or lower, or about 60 mg KOH/g or lower. Optimal ranges for hydroxyl number are dependent on ultimate use of the polyol.

In embodiments where the oligomeric fatty acid ester has hydroxyl functionality, the oligomeric fatty acid ester has a number average hydroxyl functionality (Fn) about 10 or less, for example, about 9 or less, about 8 or less, about 7 or less, about 6 or less, about 5 or less, about 4 or less, about 3 or less, about 2 or less. Typically, the number average hydroxyl functionality (Fn) ranges from about 0.9 to about 3.0. In exemplary embodiments, the number average hydroxyl functionality (Fn) is about 1.0 or greater, or about 1.5 or greater.

Oligomerization causes the viscosity of the fatty acid ester to increase as oligomers are formed. Typically, the oligomeric fatty acid ester has a viscosity of about 20 Pa·s (20,000 cps) or less, more typically about 5 Pa·s (5000 cps) to about 15 Pa·s (15,000 cps), when measured at 25° C.

Cleaving Reaction to Form Enhanced Oligomeric Polyol

After formation of the oligomeric fatty acid ester, at least a portion of the glycerol fatty acid ester bonds that are present in the oligomeric fatty acid ester are cleaved to form an enhanced oligomeric polyol of the invention. The cleaving reaction may be accomplished, for example, by reaction with a nucleophile (e.g., transesterification and amidation), thiolation, hydrogenation, or by combinations of these processes. These processes may be conducted by chemical or enzymatic routes. In exemplary processes, the fatty acid ester bonds are cleaved by amidation or transesterification reactions.

One of ordinary skill in the art will appreciate that when the glycerol fatty acid ester bond is cleaved enzymatically a variety of enzymes may be used. The use of enzymes may enable the reaction to be carried out under mild condition. Two types of enzymes that may be used in such reactions are lipases and esterases (e.g., NOVOZYM 435, a lipase from the organism *Candida antarctica* from Novozymes, Bagsvaerd, Denmark).

One of ordinary skill in the art will appreciate that the extent of cleavage of the glycerol fatty acid ester bonds (e.g., by transesterification or amidation) will depend upon the desired properties (e.g., hydroxyl number, functionality, molecular weight) in the enhanced oligomeric polyol as well as the functionality of the cleaving reagent (e.g., if ethylene glycol is used as the reagent and a low hydroxyl number (e.g., <50) is needed, the amount of ethylene glycol used will be small, resulting in low levels of transesterification). Indeed, one of the benefits of the present invention is the ability to control the hydroxyl number and the functionality of the resulting polyol.

In some embodiments, oligomerization and transesterification reactions are performed in a single reaction vessel and, in some embodiments, using the same catalyst for both the oligomerization and the transesterification reactions. For example, in an exemplary embodiment, epoxidized soybean oil is ring-opened and oligomerized using ethylene glycol. Following the oligomerization, a second portion of ethylene glycol is added and the oligomerized soybean oil is transesterified with ethylene glycol to form a polyol of the invention.

In another embodiment, the extent of epoxidation of the glycerol fatty acid ester need not be driven to completion thereby leaving residual double bonds in the fatty acid esters and in the final enhanced oligomeric polyols. Another alternative process is to intentionally not ring-open all the epoxide functionalities thereby leaving residual epoxide functionalities that are retained in the final oligomerized polyol if transesterification is performed under basic conditions.

In amidation, the amine groups in the polyamine react with the ester linkages that are present in the oligomeric fatty acid ester (i.e., glycerol fatty acid ester bonds) causing the ester groups to cleave and resulting in the formation of amide groups and hydroxyl groups. During transesterification, the alcohol groups in the polyol react with the ester linkages that are present in the oligomeric fatty acid ester (i.e., glycerol fatty acid ester bonds) causing the ester groups to cleave and resulting in the formation of ester groups and hydroxyl groups. Whether by amidation or transesterification, the formation of hydroxyl groups causes the oligomeric natural oil to become an enhanced oligomeric polyol. An idealized exemplary reaction sequence for making an amidated polyol using a thermally oligomerized natural oil is shown below in REACTION SCHEME A. An idealized exemplary reaction sequence for making a transesterified polyol using a chemically oligomerized (i.e., epoxidized and ring-opened) natural oil is shown below in REACTION SCHEME B. It is understood that the reaction schemes represent idealized structures that may form during the reactions. As known to one of skill in the art, the actual compositions would be expected to include other chemically species in addition to those shown. It should also be noted that even though the bonds between the fatty acids in the figure are shown as single bonds, there could be a single bond or multiple bonds between fatty acids in an oligomerized oil.

REACTION SCHEME A

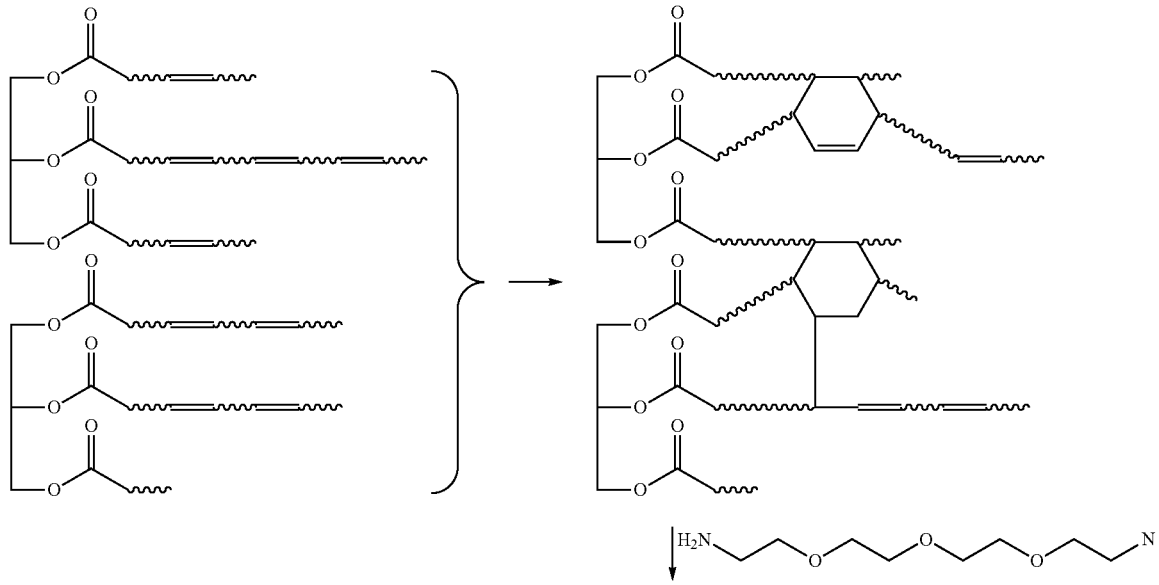

13 14
-continued
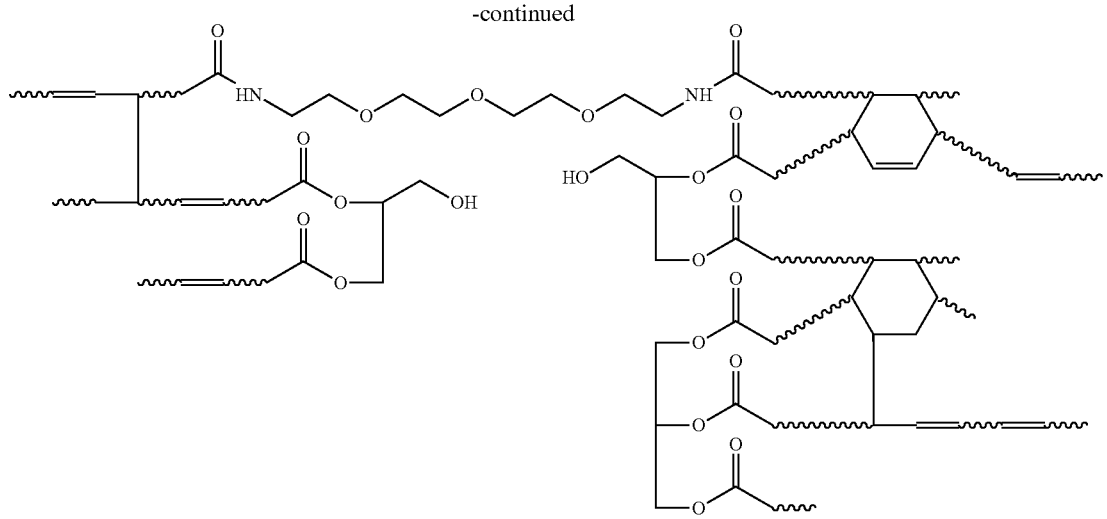
REACTION SCHEME B
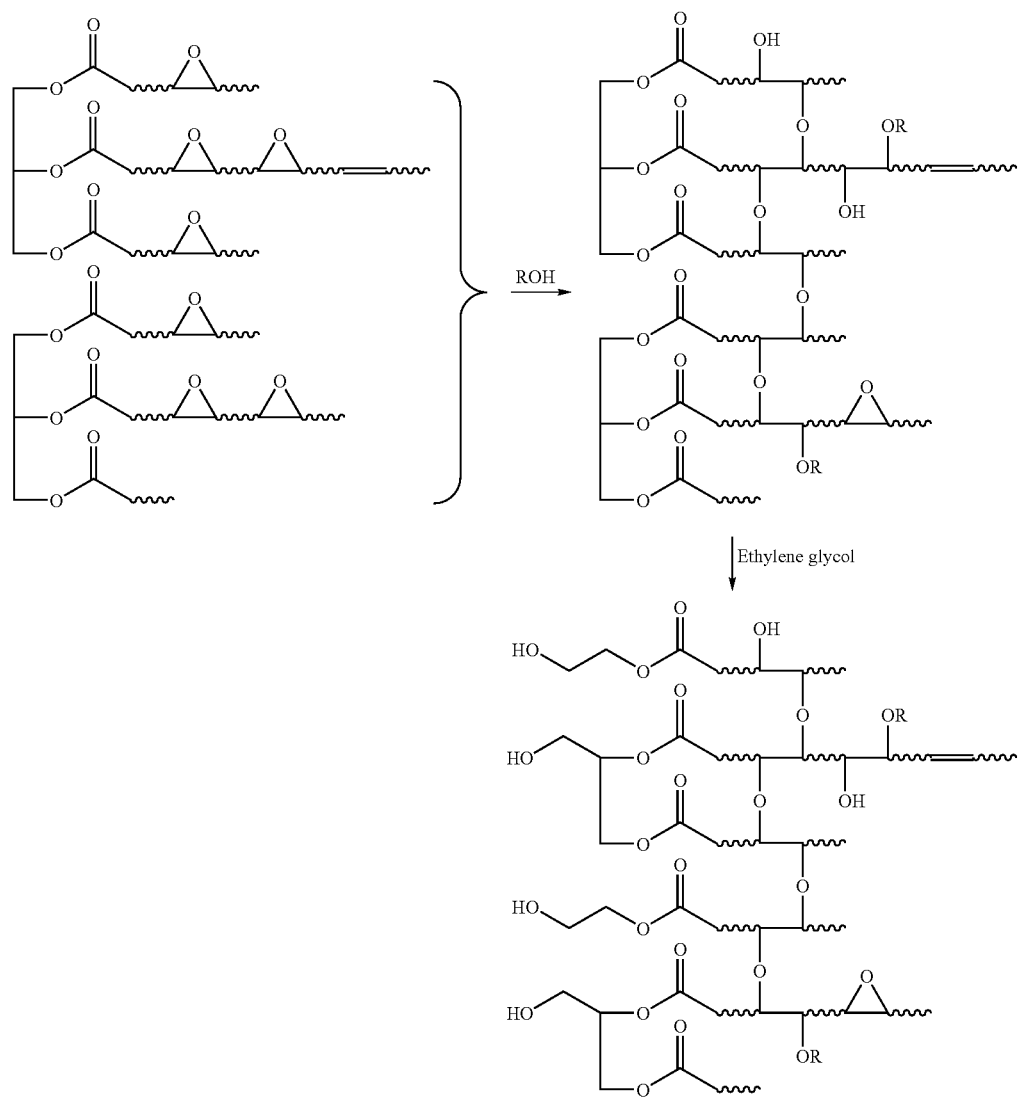

In the amidation or transesterification reaction, the oligomeric fatty acid ester and the polyamine or polyol are typically reacted at a temperature of about 50° C. to about 250° C. (typically 100°-200° C.) for a time period ranging from about 1 to about 24 hours (typically about 3 to about 10 hours). A catalyst may be used to increase the rate of reaction. Examples of catalysts include tin catalysts, alkali catalysts, acid catalysts, or enzymes. Representative alkali catalysts include NaOH, KOH, sodium and potassium alkoxides (e.g., sodium methoxide, sodium ethoxide, sodium propoxide, sodium butoxide), and DMC catalysts. Representative acid catalysts include sulfuric acid, phosphoric acid, hydrochloric acid, and sulfonic acids. One useful catalyst is dibutyltin dilaurate (e.g., commercially available under the trade designation "FASCAT 4350". Typically, the catalyst is added in an amount that ranges from about 0.1% to about 5% weight (typically about 0.1% to about 1% weight) of the reactants. In some embodiments, the catalyst is added in several batches during the amidation reaction.

In some embodiments, the step of cleaving at least a portion of the glycerol fatty acid ester bonds is accomplished by reacting the oligomeric fatty acid ester with a nucleophile. Examples include water, alcohols (e.g., monoalcohols, dialcohols, and polyalcohols), sugar alcohols, amines (e.g., monoamines, diamines, and polyamines), alkanolamines (e.g., monethanolamine, diethanolamine, triethanolamine), thiols, combinations thereof, and mixtures thereof. In some embodiments the nucleophile may also be a functionalized glycerol fatty acid ester (including for example polyols derived from plant and animal fats).

More specifically, in some embodiments, the oligomeric fatty acid ester is reacted with a nucleophile selected from the group consisting of ethylene glycol, diethylene glycol, triethylene glycol, polyethylene glycol, ethanolamine, diethanolamine, triethanolamine, amine-terminated polyethers, 1,2-propandiol, 1,3-propandiol, 1,2-butanediol, 1,4-butanediol, 1,2-cyclohexanediol, dipropylene glycol, polypropylene glycol, ethoxylated triols, propoxylated triols, poly (1,4-butanediol), 2,3-dihydroxydioxane, 1,4-dimethylolbenzene, glycerol, polyglycerol, sorbitol, pentaerythritol, trimethylolpropane, 1,1,2-trimethylolethane, castor oil, ethoxylated castor oil, hydroformylated polyols (i.e., a polyol made by the hydroformylation of natural oils), alcohol ring-opened vegetable oil polyols (i.e., epoxidized vegetable oils ring-opened with alcohols), terephthalate based polyols, polyester polyols, combinations thereof, and mixtures thereof.

Useful polyamine compounds for amidation include diamine compounds fitting the general formula:

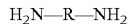

where R is an organic group, for example, an aliphatic group or an aromatic group.

Examples of diamines include polyalkylene glycol diamines, for example, polypropylene glycol diamines, polyethylene glycol diamines; ethylene diamine; 1,3-propanediamine; and 1,4-butanediamine. Also useful are aromatic diamines including aromatic compounds containing amine groups directly attached to an aromatic ring, and aromatic compounds containing hydrocarbon or polyglycols to which are attached amine groups.

In some embodiments, the diamines are amine-terminated polypropylene glycol diamines. In some embodiments, amine-terminated polypropylene glycol diamines can be represented by the formula:

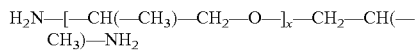

where x ranges from about 2 to about 70.

Examples of amine terminated polypropylene glycols include those commercially available under the trade designation "JEFFAMINE D" (from Huntsman Corp.). For example, JEFFAMINE D-230 has a value of x of about 2.5 and a molecular weight of about 230; JEFFAMINE D-400 has a value of x of about 6.1 and a molecular weight of about 430; JEFFAMINE D-2000 has a value of x of about 33 and a molecular weight of about 2000; and JEFFAMINE D-4000 has a value of x of about 68 and a molecular weight of about 4000.

Other useful diamines include polyalkylene glycol diamines. Examples of polyalkylene glycol diamines, include those commercially available under the trade designation 'JEFFAMINE ED" (from Huntsman Corp.). These polyalkylene glycol diamines may be represented by the general formula:

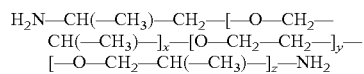

where y is about 2 to about 40;
(x+z) is about 1 to about 6; and
the molecular weight (MW) of the diamine ranges from about 200 to about 2000.

Examples of JEFFAMINE ED diamines include JEFFAMINE HK-511 (y=2.0; (x+z≅1.2; and MW=220); JEFFAMINE ED-600 (y≅9.0; (x+z)≅3.6; and MW=600); JEFFAMINE ED-900 (y≅12.5; (x+z)≅6.0; and MW=900); and JEFFAMINE ED-2003 (y≅39; (x+z)≅6.0; and MW=2000).

Additionally useful diamine compounds are unhindered diamines such as those commercially available under the trade designation "JEFFAMINE EDR" (from Huntsman Corp.). These unhindered diamines can be represented by the following general formula:

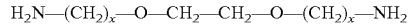

where x ranges from about 2 to 3; and
the molecular weight (MW) ranges from about 140 to about 180.

Examples of JEFFAMINE EDR diamines include JEFFAMINE EDR-148 (x=2.0; and MW=148); and JEFFAMINE EDR-176 (x=3.0; and MW=176).

Useful compounds for transesterification include diols such as ethylene glycol, propylene glycol, 1,3-propanediol, 1,4-butanediol, pentanediols, hexanediols, and the like, and mixtures thereof. Also useful are polyethylene, polypropylene and polybutylene glycols of various lengths.

Also useful are alkanolamine compounds. Alkanolamines refer to compounds that include both alcohol functionality and amine functionality. Alkanolamine compounds that contain active-hydrogen containing amine groups (e.g., primary and secondary amines) may participate in both amidation and transesterification reactions. Typically, the amidation reaction proceeds faster than the transesterification reaction when these compounds are used. Examples include monoethanolamine and diethanolamine. Alkanolamines compounds that include tertiary amines (e.g., triethanolamine) participate only in transesterification.

The amount of polyamine or polyol is selected to provide an amidated or transesterified polyol having the desired properties. If the amount of polyamine or polyol incorporated into the amidated or transesterified polyol is too low then the polyurethane polymer may not have the desired properties. Typically, the amount of polyamine or polyol used is effective to amidate or transesterify about 10% or greater of the glycerol fatty acid ester groups that are present in the oligomeric natural oil. In other embodiments, the amount of polyamine or polyol used is effective to amidate or transesterify about 50% or greater of the glycerol fatty acid ester groups that are present in the oligomeric natural oil. Accordingly, in the amidated or transesterified polyol about 90% or less of the glycerol fatty acid ester groups that are initially present in the oligomeric natural oil remain intact after amidation or transesterification. In other embodiments, about 50% or less of the glycerol fatty acid ester groups that are initially present in the oligomeric natural oil remain intact after amidation or transesterification.

In some embodiments, the cleaving reaction is conducted by hydrogenation. Hydrogenation may be conducted, for example, by using processes and catalysts that are conventional in the art of hydrogenation of vegetable oils. In some instances a metal catalyst is used to promote hydrogenation. Examples of metal catalyst include nickel, copper, palladium, platinum, molybdenum, iron, ruthenium, osmium, rhodium, or iridium. Combinations of metals may also be used. Useful catalyst may be heterogeneous or homogeneous.

Hydrogenation may be carried out in a batch or in a continuous process. In a representative batch process, a vacuum is pulled on the headspace of a stirred reaction vessel and the reaction vessel is charged with the oligomeric fatty acid ester. The oligomeric fatty acid ester is then heated to a desired temperature. Typically, the temperature ranges from about 50° C. to 350° C., for example, about 100° C. to 300° C. or about 150° C. to 250° C. When the oligomeric fatty acid ester has reached the desired temperature, the hydrogenation catalyst is then added to the reaction vessel. Hydrogen gas is then pumped into the reaction vessel to achieve a desired pressure of $H_2$ gas. Typically, the $H_2$ gas pressure ranges from about 15 to 3000 psig, for example. Under these conditions the hydrogenation reaction begins and the temperature is allowed to increase to the desired hydrogenation temperature, where it is maintained. When the hydrogenation is complete, the reaction mass is cooled and the resulting enhanced oligomeric polyol is discharged from the reaction vessel. Details of hydrogenation may be found, for example, in *Bailey's Industrial Oil & Fat Products* (Hui, Y. H; $5^{th}$ Edition; Volume 2).

Similar to the oligomeric fatty ester described above, the enhanced oligomeric polyols of the invention will comprise intercrosslinks. An intercrosslink functions to bond a fatty acid ester that is bound to one glycerol molecule with a fatty acid ester that is bound to a second glycerol molecule. When two glycerol molecules are bound by an intercrosslink between two fatty acid molecules, the intercrosslinked pair is described as a "dimer". Similarly, when three distinct glycerol fatty acid ester molecules are bound by intercrosslinks, it is referred to as a "trimer". Higher order oligomers may also be present. In many embodiments, the enhanced oligomeric polyol of the invention comprises dimers, trimers, as well as higher order oligomers. In some embodiments, the enhanced oligomeric polyol is processed to separate out a desired species of oligomer, for example, to separate the dimer species. In this way a substantially homogenous enhanced oligomeric polyol product may be obtained.

One of ordinary skill in the art will appreciate that if the oligomeric fatty acid ester is not fully crosslinked, the cleaving reaction (e.g., amidation or transesterification) which cleaves a portion of the glycerol fatty acid ester bonds may also cause some of the fatty acid esters to be cleaved from the resulting enhanced oligomeric natural oil polyol. This reaction may cause a decrease in the molecular weight of the enhanced oligomeric polyol as compared to the molecular weight of the oligomeric fatty acid ester from which it is formed. Therefore, in many embodiments it is desirable to use an oligomeric fatty acid ester that has a higher molecular weight than the desired molecular weight of the final enhanced oligomeric natural oil polyol.

The cleaving reaction (e.g., amidation or transesterification) may result in the formation of both primary and secondary hydroxyl groups in the resulting enhanced oligomeric polyol. In some embodiments the enhanced oligomeric polyol has at least 10%, at least 15%, at least 20%, at least 25%, and at least 50% hydroxyl functionality in the form of primary hydroxyl groups. In some embodiments, amine functionality may be present in enhanced oligomeric polyol made by amidation as a result of the presence of partially reacted polyamine compounds. For example, partially-reacted polyamine may result in the presence of primary amine functionality in amidated polyols. The extent of the cleaving reaction may be controlled to provide an enhanced oligomeric polyol having the desired functionality and hydroxyl number.

In some embodiments, the enhanced oligomeric polyol has a number average hydroxyl functionality (Fn) about 10 or less, for example, about 9 or less, about 8 or less, about 7 or less, about 6 or less, about 5 or less, about 4 or less, about 3 or less, about 2 or less. Typically, the number average hydroxyl functionality (Fn) ranges from about 0.9 to about 3.0. In exemplary embodiments, the number average hydroxyl functionality (Fn) is about 1.0 or greater, or about 1.5 or greater.

In some embodiments, the enhanced oligomeric polyol has a hydroxyl number (OH number) that ranges from about 10 to about 200 mg KOH/g, or from about 20 to about 100 mg KOH/g. Hydroxyl number indicates the number of reactive hydroxyl groups available for reaction. It is expressed as the number of milligrams of potassium hydroxide equivalent to the hydroxyl content of one gram of the sample.

In some embodiments, the enhanced oligomeric polyol has a low acid value. Acid value is equal to the number of milligrams of potassium hydroxide (KOH) that is required to neutralize the acid that is present in one gram of a sample of the polyol (i.e., mg KOH/gram). A high acid value is undesirable because the acid may neutralize the amine catalyst causing a slowing of the isocyanate-polyol reaction rate. In some embodiments, the enhanced oligomeric polyol has an acid value that is less than about 5 (mg KOH/gram), for example, less than about 4 (mg KOH/gram), less than about 3 (mg KOH/gram), less than about 2 (mg KOH/gram), or less than about 1 (mg KOH/gram). In exemplary embodiments, the acid value is less than about 1 (mg KOH/gram), for example, less than about 0.5 (mg KOH/gram), or from about 0.2 to about 0.5 (mg KOH/gram).

In some embodiments, the number average molecular weight (i.e., Mn) of the enhanced oligomeric polyol is about 1200 Da or greater, for example, about 1300 Da or greater, about 1400 Da or greater, or about 1500 Da or greater. In some embodiments, the Mn is about 6000 Da or less, for example, about 4000 Da or less, or about 3500 Da or less. In some embodiments, the Mn ranges from about 1200 Da to about 6000 Da, for example, about 1200 Da to 3500 Da. Number average molecular weight may be measured, for example, by GPC, light scattering, vapor pressure osmometry, end-group titration, and colligative properties.

In some embodiments, the weight average molecular weight (i.e., Mw) of the enhanced oligomeric polyol is about 2000 Da or greater, for example, about 3000 Da or greater, about 4000 Da or greater, about 5000 Da or greater. In some embodiments, the Mw is about 20,000 Da or less, for example, about 10,000 Da or less, or about 6,000 Da or less. In some embodiments, the Mw ranges from about 2000 Da to about 20,000 Da, for example, about 2000 Da to about 6,000 Da. Weight average molecular weight may be measured, for example, GPC, light scattering, small angle neutron scattering (SANS), X-ray scattering, and sedimentation velocity.

Typically, the enhanced oligomeric polyol has a polydispersity (Mw/Mn) of about 1 to about 15, more typically ranging from about 1 to about 6.

In some embodiments the enhanced oligomeric polyol has a viscosity at 25° C. of about 20 Pa·s (20,000 cps) or less, about 15 Pa·s (15,000 cps) or less, about 12 Pa·s (12,000 cps) or less, about 10 Pa·s (10,000 cps) or less, or about 5 Pa·s (5000 cps) or less.

In some embodiments, the enhanced oligomeric polyol has few, if any, residual double bonds. One measure of the amount of double bonds in a substance is its iodine value (IV). The iodine value for a compound is the amount of iodine that reacts with a sample of a substance, expressed in centigrams iodine ($I_2$) per gram of substance (cg $I_2$/gram). When chemically oligomerized and amidated or transesterified, the polyol typically has an iodine value of about 50 or less, for example about 40 or less, about 30 or less, about 20 or less, about 10 or less, or about 5 or less. When thermally oligomerized soybean oil is amidated or transesterified, the polyol may have a higher iodine value, for example, about 100 or less.

Polymers of Enhanced Oligomeric Polyols

Polyols of the invention are suitable for use in polymers, for example, polyethers, polyesters, polycarbonates, polyurethanes, and combinations (e.g., copolymers) thereof.

Polyurethane Compositions

In exemplary embodiments, the enhanced oligomeric polyols of the invention are useful in polyurethanes. Examples of polyurethanes include foams, coatings, adhesives, elastomers sealants, and the like. Examples of polyurethane foams include slabstock foams (e.g., flexible slabstock foams) and molded foams. Rigid foams (e.g., for insulation) are also within the scope of the invention. Viscoelastic foams comprising certain enhanced oligomeric polyols are reported in U.S. Ser. No. 60/859,337, entitled "Viscoelastic Polyurethane Foams Comprising Amidated or Transesterified Oligomeric Natural Oil Polyols", filed Nov. 16, 2006.

In some embodiments, the polyurethanes may comprise the reaction product of (a) a polyisocyanate; and (b) an isocyanate-reactive composition comprising an enhanced oligomeric polyol of the invention. The hydroxyl groups present on the enhanced oligomeric polyol chemically react with the isocyanate groups of the polyisocyanate to form urethane linkages. Thus, the enhanced oligomeric polyol is chemically incorporated into a polyurethane polymer. The polyurethane compositions of the invention are useful in polyurethane foams, for example, in flexible slabstock and molded polyurethane foams.

The amount of enhanced oligomeric polyol included in the isocyanate-reactive composition can be selected based upon the desired properties of the polyurethane. For example, in some embodiments, the isocyanate-reactive composition comprises about 10% wt. to about 90% wt. oligomeric polyol, for example, about 10% wt. to about 60% wt. oligomeric polyol, or about 15% wt. to about 40% wt. oligomeric polyol.

In some embodiments, the isocyanate-reactive composition comprises an enhanced oligomeric polyol of the invention and a petroleum-derived polyol. For example, in some embodiments, the isocyanate-reactive composition comprises about 10% wt. to about 90% wt. enhanced oligomeric polyol and about 10% wt. to about 90% wt. petroleum-derived polyol. In other embodiments, the isocyanate-reactive composition comprises about 10% wt. to about 60% wt. enhanced oligomeric polyol and about 40% wt. to about 90% wt. petroleum-derived polyol. In yet other embodiments, the isocyanate-reactive composition comprises about 15% wt. to about 40% wt. enhanced oligomeric polyol and about 60% wt. to about 85% wt. petroleum-derived polyol.

In some embodiments, the petroleum-derived polyol is a triol. As used herein, the term "triol" refers to a polyol that has an average of about 2.7 to about 3.1 hydroxyl groups per molecule. In a specific embodiment, the triol has a weight average molecular weight (Mw) of about 3000 Da to about 3500 Da. Representative examples of commercially available petroleum-derived triols include those available under the trade designations ARCOL F3040, ARCOL F3022, and ARCOL 3222 (from Bayer), PLURACOL 1385 and PLURACOL 1388 (from BASF), VORANOL 3322, VORANOL 3010, VORANOL 3136, and VORANOL 3512A (from Dow).

Representative examples of useful polyisocyanates include those having an average of at least about 2.0 isocyanate groups per molecule. Both aliphatic and aromatic polyisocyanates can be used. Examples of suitable aliphatic polyisocyanates include 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate, 1,5-diisocyanato-3,3,5-trimethylcyclohexane, hydrogenated 2,4- and/or 4,4'-diphenylmethane diisocyanate (H12MDI), isophorone diisocyanate, and the like. Examples of suitable aromatic polyisocyanates include 2,4-toluene diisocyanate (TDI), 2,6-toluene diisocyanate (TDI), and blends thereof, 1,3- and 1,4-phenylene diisocyanate, 4,4'-diphenylmethane diisocyanate (including mixtures thereof with minor quantities of the 2,4'-isomer) (MDI), 1,5-naphthylene diisocyanate, triphenylmethane-4,4',4"-triisocyanate, polyphenylpolymethylene polyisocyanates (PMDI), and the like. Derivatives and prepolymers of the foregoing polyisocyanates, such as those containing urethane, carbodiimide, allophanate, isocyanurate, acylated urea, biuret, ester, and similar groups, may be used as well.

The amount of polyisocyanate preferably is sufficient to provide an isocyanate index of about 60 to about 120, preferably about 70 to about 110, and, in the case of high water formulations (i.e., formulations containing at least about 5 parts by weight water per 100 parts by weight of other active hydrogen-containing materials in the formulation), from about 70 to about 90. As used herein the term "isocyanate index" refers to a measure of the stoichiometric balance between the equivalents of isocyanate used to the total equivalents of water, polyols and other reactants. An index of 100 means enough isocyanate is provided to react with all compounds containing active hydrogen atoms.

Examples of useful catalysts include tertiary amine compounds and organometallic compounds. Specific examples of useful tertiary amine compounds include triethylenediamine, N-methylmorpholine, N-ethylmorpholine, diethyl ethanolamine, N-coco morpholine, 1-methyl-4-dimethylaminoethyl piperazine, 3-methoxy-N-dimethylpropylamine, N,N-diethyl-3-diethylaminopropylamine, dimethylbenzyl amine, bis(2-dimethylaminoethyl)ether, and the like. Tertiary amine catalysts are advantageously used in an amount from about 0.01 to about 5, preferably from about 0.05 to about 2 parts per 100 parts by weight of the active hydrogen-containing materials in the formulation.

Specific examples of useful organometallic catalysts include organic salts of metals such as tin, bismuth, iron, zinc, and the like, with the organotin catalysts being preferred. Suitable organotin catalysts include dimethyltindilaurate, dibutyltindilaurate, stannous octoate, and the like. Other suitable catalysts are taught, for example, in U.S. Pat. No. 2,846,408, which is hereby incorporated by reference. Preferably, about 0.001 to about 1.0 parts by weight of an organometallic catalyst is used per 100 parts by weight of the active hydrogen-containing materials in the formulation. Blends of catalysts may also be used.

In some embodiments, a blowing agent is used. A blowing agent is a gas or other substance that is capable of producing a gas during formation of the polyurethane. Blowing agents are typically used to make polyurethane foams. Suitable blowing agents include water, liquid carbon dioxide, acetone, methylene chloride, and pentane, with water being preferred.

The blowing agent is used in an amount sufficient to provide the desired foam density and indentation force deflection (IFD). For example, when water is used as the only blowing agent, from about 0.5 to about 10, preferably from about 1 to about 8, more preferably from about 2 to about 6 parts by weight, are used per 100 parts by weight of other active hydrogen-containing materials in the formulation.

Other additives that may be included in the formulation include surfactants, catalysts, cell size control agents, cell opening agents, colorants, antioxidants, preservatives, static dissipative agents, plasticizers, crosslinking agents, flame retardants, and the like.

Examples of useful surfactants include silicone surfactants and the alkali metal salts of fatty acids. The silicone surfactants, e.g., block copolymers of an alkylene oxide and a dimethylsiloxane, are preferred, with "low fog" grades of silicone surfactants being particularly preferred.

In some cases, a static dissipative agent may be included in the formulation during foam preparation, or used to treat the finished foam. Useful examples include non-volatile, ionizable metal salts, optionally in conjunction with an enhancer compound, as described in U.S. Pat. Nos. 4,806,571, 4,618,630, and 4,617,325. Of particular interest is the use of up to about 3 weight percent of sodium tetraphenylboron or a sodium salt of a perfluorinated aliphatic carboxylic acid having up to about 8 carbon atoms.

In some embodiments, the polyurethane compositions are suitable for flexible slabstock polyurethane foams. Flexible slabstock polyurethane foams can be manufactured using conventional slabstock foaming equipment, for example, commercial box-foamers, high or low pressure continuous foam machines, crowned block process, rectangular block process (See, e.g., Draka, Petzetakis, Hennecke, Planiblock, EconoFoam, and Maxfoam processes), or verti-foam process. In some embodiments, the slabstock foam is produced under reduced pressure. For example, in variable pressure foaming (VPF), the complete conveyor section of the foaming machine is provided in an airtight enclosure. This technique allows for the control of foam density and the production of foam grades that may otherwise be difficult to produce. Details of flexible slabstock polyurethane foams and slabstock foaming processes are reported, for example, in Chapters 5 and 9 of Flexible Polyurethane Foams, edited by Herrington and Hock, (2nd Edition, 1997, Dow Chemical Company).

The invention will now be described with reference to the following non-limiting examples.

EXAMPLE 1

Transesterification of Ring-Opened Epoxidized Soybean Oil (Preparation of EOP-1)

Step 1: Preparation of Oligomeric Ring-Opened Epoxidized Soybean Oil Polyols (Oligomeric Polyol (OP-1))

1360 grams of ethylene glycol, 0.52 grams of $HBF_4$, and 136 grams of methanol were placed in three-neck round bottom jacketed reaction flask that was equipped with a reflux condenser and a mechanical stirrer. The mixture was heated to 95° C. and 1000 grams of epoxidized soybean oil (FLEXOL EPO, Dow Chemical) was added. The contents of the flask were stirred for 2.7 hours at 95° C. The reaction mixture was then transferred to a separatory funnel and was allowed to separate for several hours. The bottom layer containing the ethylene glycol was removed and the upper layer containing the oligomeric polyol (OP-1) was transferred to a round bottom flask where it was neutralized with ammonium carbonate (0.1% by weight of the oligomeric polyol). The neutralized oligomeric polyol was then transferred to a wipe-film evaporator. The wall temperature of the evaporator was 120° C.

This above procedure was used specifically for the preparation of OP-1.1, but also describes the processes for the other samples in TABLE 1.1, with the appropriate modifications as shown.

TABLE 1.1

Reaction Conditions for Preparing Oligomeric Polyols (OP-1)

| Sample | ESBO (g) | Ethylene Glycol (g) | Methanol (g) | $HBF_4$ (g) [% pure of the total mixture] | Reaction time (hours) |
|---|---|---|---|---|---|
| OP-1.1 | 1000 | 1360 | 136 | 0.52 [0.01] | 2.7 |
| OP-1.2 | 1000 | 1360 | 136 | 0.52 [0.01] | 5.0 |
| OP-1.3 | 1000 | 1360 | 136 | 1.00 [0.02] | 3.0 |
| OP-1.4 | 1000 | 1360 | 136 | 0.52 [0.01] | 7.5 |

Characteristics and properties of the oligomeric polyols of TABLE 1.1 are reported in TABLES 1.1A and 1.1B.

TABLE 1.1A

Characteristics of Oligomeric Polyols (OP-1)

| Sample | OH Number (mg KOH/g) | EOC (%) | Viscosity (Pa·s @ 25° C.) [cps @ 25° C.] |
|---|---|---|---|
| OP-1.1 | 183 | 3.35 | 0.75 [750] |
| OP-1.2 | 199 | 1.73 | 6.0 [6000] |
| OP-1.3 | 247 | 0.13 | 24.0 [24,000] |
| OP-1.4 | 251 | 0.72 | 22.8 [22,800] |

TABLE 1.1B

Characteristics of Oligomeric Polyols (OP-1)

| Sample | Oligomer (%) | Monomer (%) | Mn (GPC) | fn (GPC) | Mw (GPC) | Mw/Mn |
|---|---|---|---|---|---|---|
| OP-1.1 | 28 | 72 | 1156 | 3.77 | 1398 | 1.21 |
| OP-1.2 | 37 | 63 | 1329 | 4.71 | 1815 | 1.37 |
| OP-1.3 | 68 | 30 | 2015 | 8.87 | 6191 | 3.07 |
| OP-1.4 | 49 | 49 | 1798 | 8.04 | 3004 | 1.67 |

Step 2: Preparation of Enhanced Oligomeric Polyols (Enhanced Oligomeric Polyol (EOP-1))

The oligomeric polyols (OP-1) were converted to enhanced oligomeric polyols (EOP-1) by reaction with ethylene glycol in the presence of potassium methoxide. The mixture of the oligomeric polyol, ethylene glycol, and potassium methoxide was heated to 160° C. and was stirred for 15 minutes. Specific amounts and conditions for the samples are presented in TABLE 1.2

TABLE 1.2

Reaction Conditions for Converting Oligomeric Polyols
(OP-1) to Enhanced Oligomeric Polyols (EOP-1)

| Enhanced Oligomeric Polyol EOP-1 | Oligomeric Polyol OP-1 | Amount of OP-1 (g) | Ethylene Glycol (g) | K-methoxide, (g) [%] | Reaction time (min) | Reaction temperature (° C.) |
|---|---|---|---|---|---|---|
| EOP-1.1 | OP-1.1 | 950 | 40 (added) | 0.5 [0.05] | 15 | 160 |
| EOP-1.2 | OP-1.2 | 1000 | Residual | 0.5 [0.05] | 15 | 160 |
| EOP-1.3 | OP-1.3 | 1000 | Residual | 0.5 [0.05] | 15 | 160 |
| EOP-1.4 | OP-1.4 | 1000 | Residual | 0.5 [0.05] | 15 | 160 |

Properties of the enhanced oligomeric polyols are presented in TABLES 1.2A and 1.2B.

TABLE 1.2A

Properties of Enhanced Oligomeric Polyols (EOP-1)

| Polyol | OH Number (mg KOH/gram) | Viscosity (Pa · s @ 25° C.) [cps @ 25° C.] |
|---|---|---|
| EOP-1.1 | 167 | 1.2 [1200] |
| EOP-1.2 | 217 | 7.0 [7000] |
| EOP-1.3 | 219 | 9.6 [9600] |
| EOP-1.4 | 224 | 8.7 [8700] |

TABLE 1.2B

Properties of Enhanced Oligomeric Polyols (EOP-1)

| Polyol | Oligomer (%) | Monomer (%) | Mn (GPC) | fn (GPC) | Mw (GPC) | Mw/Mn |
|---|---|---|---|---|---|---|
| EOP-1.1 | 20 | 54 | 937 | 2.79 | 1362 | 1.45 |
| EOP-1.2 | 36 | 54 | 1241 | 4.80 | 1955 | 1.57 |
| EOP-1.3 | 39 | 50 | 1390 | 5.42 | 2547 | 1.83 |
| EOP-1.4 | 39 | 50 | 1203 | 4.80 | 2194 | 1.82 |

EXAMPLE 2

Preparation of Enhanced Oligomeric Polyol (EOP 2.1) by Transesterification of Ring-Opened Epoxides Derived from Soybean Oil Step 1: 1360 grams of ethylene glycol, 1.0 gram of $HBF_4$, and 136 grams of methanol were placed in a three-neck round bottom jacketed reaction flask equipped with a reflux condenser and a mechanical stirrer. The mixture was heated to 100° C. and 1000 grams of epoxidized soybean oil (ESBO, Epoxol 7-4, ACS, EOC=7.0%) was added. The contents of the flask were then stirred for 3.0 hours at 95° C. The reaction mixture was then transferred to a separatory funnel and was allowed to separate for several hours. The bottom layer which contained the ethylene glycol, was removed and the upper layer containing the oligomeric polyol was transferred to a round bottom flask where it was neutralized with 0.5 gram of potassium methoxide.

Step 2: Transesterification of OP-2.1 was performed at 160° C. for 15 minutes. Following transesterification, the product was transferred to a wipe-film evaporator. The wall temperature of the evaporator was 120° C. and the vacuum was set at 1 mm Hg. After removal of the ethylene glycol, a known weight of ethylene glycol (50 g) was added to the mixture to reduce the viscosity. The enhanced oligomeric polyol EOP-2.1 isolated from this process is characterized in TABLES 2.1-2.3.

TABLE 2.1

Properties of EOP-2.1

| Sample | OH Number (mg KOH/gram) | Viscosity (Pa · s @ 25° C.) [cps @ 25° C.] |
|---|---|---|
| EOP-2.1 | 266 | 13 [13,000] |

TABLE 2.2

Properties of EOP 2.1 (with 5% ethylene glycol added)

| Sample | OH Number (mg KOH/g) | Primary OH (%) | EOC (%) | Viscosity (Pa · s @ 25° C.) [cps @ 25° C.] | Acid Value (mg KOH/gram) | Water (%) |
|---|---|---|---|---|---|---|
| EOP-2.1 | 335 | 59 | 0.13 | 8.0 [8000] | 0.55 | 0 |

TABLE 2.3

Properties of EOP-2.1

| Sample | Oligomer (%) | Monomer (%) |
|---|---|---|
| EOP-2.1 | 42 | 43 |

EXAMPLE 3

Transesterification of Ring-Opened Epoxides Derived from Soybean Oil to form Enhanced Oligomeric Polyol (EOP-3). (Effect of Transesterification Catalysts)

Step 1: In Step 1 Three Different Oligomeric Polyol (A, B, and C) were Synthesized in Order to Prepare OP-3.

Synthesis of Polyol A $HBF_4$, methanol, and ethylene glycol were placed in a three-neck round bottom jacketed reaction flask equipped with a reflux condenser and a mechanical stirrer. The mixture was preheated to 100° C. Next, partially epoxidized soybean oil (EOC=2.28; IV=79) was added and the mixture was stirred for 6 hours. The mixture of polyol and reactant was then transferred into a separatory funnel and left for gravity separation over night. The bottom layer (i.e., the ethylene glycol/methanol layer) was removed and the upper layer containing the polyol was transferred into a round bottom flask and was neutralized with ammonium carbonate (0.1% per polyol weight). The mixture was then transferred to the wipe-film evaporator. The wall temperature in the evaporator was 120° C. The reaction conditions are set forth in TABLE 3.1 and the polyol characteristics are provided in TABLES 3.2 to 3.3.

TABLE 3.1

| Sample | Partially ESBO | EG (g) | Methanol (g) | $HBF_4$ (g) [% pure of the total mixture] | Temp. (° C.) | Time (hours) |
|---|---|---|---|---|---|---|
| A | 900 | 600 | 60 | 1.65 [0.05%] | 100 | 6 |

TABLE 3.2

Polyol Characteristics

| Sample | OH# (mg KOH/g) | EOC (%) | AV (mg KOH/g) | PV (meq/Kg) | IV | Water (%) | Viscosity (Pa·s @ 25° C.) [cps @ 25° C.] |
|---|---|---|---|---|---|---|---|
| A | 107.3 | 0.12 | 0.56 | 22 | 75 | 0 | 1.7 [1700] |

TABLE 3.3

Polyol Characteristics

| Sample | Oligomer (%) | Monomer (%) | Fn | Mn (GPC) | Mw (GPC) | Mw/Mn |
|---|---|---|---|---|---|---|
| A | 37 | 63 | 2.46 | 1287 | 1857 | 1.44 |

Synthesis of Polyol B $HBF_4$, methanol, and ethylene glycol were put in a three-neck round bottom jacketed reaction flask equipped with a reflux condenser and a mechanical stirrer. The mixture was preheated to 100° C. Next, a mixture of two partially epoxidized soybean oils (250 grams of partially epoxidized soybean oil having EOC=3.39, IV=69 and PV=26.8 and 750 grams of partially epoxidized soybean oil having EOC=2.32, IV=87.7 and PV=21.7) was added and the mixture was stirred and kept at 100° C. for 6 hours. The mixture of polyol and ethylene glycol was then transferred into a separatory funnel and was left for several hours. The bottom layer (i.e., the ethylene glycol/methanol layer) was removed and the upper polyol layer was transferred to a round bottom flask and was neutralized with ammonium carbonate (0.1% per polyols weight). The material was then transferred to the wipe-film evaporator. The wall temperature in the evaporator was 120° C. The reaction conditions are set forth in TABLE 3.4 and the polyol characteristics are provided in TABLES 3.5 to 3.6.

TABLE 3.4

| 1 | Partially ESBO (g) | Ethylene Glycol (g) | Methanol (g) | $HBF_4$ (g) [% pure of the total mixture] | Reaction Temp. (° C.) | Reaction time (hour) |
|---|---|---|---|---|---|---|
| B | 1000 | 750 | 75 | 1.9 [0.05] | 100 | 6 |

TABLE 3.5

Polyol Characteristics

| Sample | OH# (mg KOH/g) | Primary OH (%) | EOC (%) | AV (mg KOH/g) | PV (meq/Kg) | IV Calc. | Water (%) | Visc. (Pa·s @ 25° C.) [cps @ 25° C.] |
|---|---|---|---|---|---|---|---|---|
| B | 111 | 32.2 | 0.064 | 0.77 | 7.0 | 83 | 0 | 0.7 [700] |

TABLE 3.6

Polyol Characteristics

| Sample | Oligomer (%) | Monomer (%) | Fn | Mn (GPC) | Mw (GPC) | Mw/Mn |
|---|---|---|---|---|---|---|
| B | 35 | 62 | 2.47 | 1283 | 1806 | 1.41 |

Synthesis of Oligomeric Polyol C

HBF$_4$, methanol, and ethylene glycol were put in a three-neck round bottom jacketed reaction flask equipped with a reflux condenser and a mechanical stirrer. The mixture was preheated to 100° C. Next, a partially epoxidized soybean oil (EOC=2.40, PV=27.8, IV=81.2) was added and the mixture was stirred and kept for the predetermined reaction time. Next, the mixture of polyol and ethylene glycol was transferred into a separatory funnel and was left for several hours. The bottom layer (ethylene glycol/methanol layer) was removed and the upper polyol layer was transferred to the round bottom flask and was neutralized with ammonium carbonate (0.1% per polyols weight). The material was then transferred to the wipe-film evaporator. The wall temperature in the evaporator was 120° C. The reaction conditions are set forth in TABLE 3.7 and the polyol characteristics are provided in TABLES 3.8 to 3.9.

TABLE 3.7

| Sample | Partially ESBO (g) | Ethylene Glycol (g) | Methanol (g) | HBF$_4$ (g) [% pure of the total mixture] | React. Temp. (° C.) | Reaction time (hour) |
|---|---|---|---|---|---|---|
| C | 1000 | 1000 | 100 | 2.2 [0.05] | 100 | 6 |

TABLE 3.8

Polyol Characteristics

| Sample | OH# (mg KOH/g) | Primary OH (%) | EOC (%) | Acid Value (mg KOH/g) | PV (meq/kg) | Water (%) | Visc. (Pa·s @ 25° C.) [cps @ 25° C.] |
|---|---|---|---|---|---|---|---|
| C | 104 | 16.5 | 0.165 | 0.42 | 9.7 | 0 | 0.50 [500] |

TABLE 3.9

Polyol Characteristics

| Sample | Oligomer (%) | Monomer (%) | Fn | Mn (GPC) | Mw (GPC) | Mw/Mn |
|---|---|---|---|---|---|---|
| C | 33 | 65 | 2.19 | 1182 | 1629 | 1.38 |

An equal amount of Oligomeric Polyols A, B, and C were mixed to form OP-3 for use in Step 2 of this EXAMPLE.

Step 2: Preparation of Enhanced Oligomeric Polyol 200 gm of an oligomeric polyol (OP-3) was mixed with 4 grams of ethylene glycol and 0.1% wt. of Fascat 4350 (Atofina Chemicals) in a three neck round bottom reaction flask equipped with a reflux condenser and a mechanical stirrer. The contents were mixed and reacted at 200° C. using Ca(OH)$_2$. The reactor was purged with nitrogen during the reaction. After the reaction was stopped, the reaction mixture was transferred to a round bottom flask and neutralized with ammonium carbonate (0.1% by weight of OP-3). The neutralized material was then transferred to a wipe-film evaporator. The wall temperature of the evaporator was 120° C.

The above procedure specifically describes the preparation for sample EOP-3.4, but also describes the processes for the other samples in TABLE 3.10 below with the appropriate modifications as noted in the table.

TABLE 3.10

| Sample | OP-3 (g) | Ethylene Glycol (g) | Catalyst, (%) | Temp (° C.) | Appearance |
|---|---|---|---|---|---|
| EOP-3.1 | 200 | 4 | Fascat 4350 (0.1) | 160 | Yellow, opaque |
| EOP-3.2 | 200 | 5 | Fascat 4350 (0.1) | 160 | Yellow, opaque |
| EOP-3.3 | 200 | 4 | K-methoxide, (0.05) | 160 | Clear, Yellow |
| EOP-3.4 | 200 | 4 | Ca(OH)$_2$ (0.1) | 200 | Slight opaque, yellow |
| EOP-3.5 | 200 | 4 | Guanidine carbonate (0.1) | 160 | Clear dark brown |

TABLE 3.10-continued

| Sample | OP-3 (g) | Ethylene Glycol (g) | Catalyst, (%) | Temp (° C.) | Appearance |
|---|---|---|---|---|---|
| EOP-3.6 | 200 | 4 | Super base (0.1) | 160 | Opaque, yellow |

The enhanced oligomeric polyols isolated from this process are characterized in TABLE 3.11. Also shown are the characteristics of oligomeric polyol OP-3 which was used as the starting material for Step 2.

TABLE 3.11

| Sample | Reaction time (hours) | OH # (mg KOH/g) | Viscosity (Pa·s @ 25° C.) [cps @ 25° C.] | Oligomer (%) | Monomer (%) | Digly + Monogly (%) |
|---|---|---|---|---|---|---|
| OP-3 | — | 110 | 0.66 [660] | 35 | 63 | 2 |
| EOP-3.1 | 4 | 100 | 0.63 [630] | — | — | — |
| EOP-3.2 | 5 | 115 | 0.57 [570] | 48 | 22 | 30 |
| EOP-3.3 | 2 | 135 | 0.52 [520] | 36 | 49 | 15 |
| EOP-3.4 | 4 | 99 | 0.86 [860] | 58 | 15 | 27 |
| EOP-3.5 | 4 | 127 | 0.56 [560] | 36 | 47 | 16 |
| EOP-3.6 | 3 | 122 | 0.52 [520] | 41 | 27 | 32 |

EXAMPLE 4

Example 4.1

Preparation of Enhanced Oligomeric Polyols by Amidation of Methanol Ring-Opened Oligomeric Polyols Step 1: Preparation of Oligomeric Polyol (OP-4.1) from ESBO 2034 grams of ESBO (Flexol Plasticizer ESO from Dow Chemical Co. a yellow viscous liquid having the following properties: viscosity of 171 cSt, total epoxide of 7.0 wt. %, N of 0.9, acid number of 0.2 mg KOH/g, and hydroxyl value of 7 mg KOH/g) was added to a mixture containing 4.4 grams of fluoroboric acid (48% in water from Aldrich Chemicals, Milwaukee, Wis.) and 120 grams of methanol (certified ACS grade from Fisher Scientific, Pittsburgh, Pa.) in a 10-liter reactor equipped with a mechanical stirrer, thermocouple, water-cooled condenser, and cooling coil. The mixture was stirred and warmed to 35° C., at which point an exotherm occurred and the temperature quickly rose to 84° C. accompanied by extensive foaming despite water cooling being applied. After the temperature returned to 60° C., the mixture was stirred for one additional hour. The heating source was removed and 2 liters of toluene and 50 grams of a weakly-basic macroporous anion-exchange resin (Lewatit MP 64 from Sybron Chemicals, Birmingham, N.J.) were added to the reactor. Stirring was continued for one hour and the temperature was allowed to fall naturally. The mixture was filtered, and the resulting filtrate was place on a rotary evaporator to remove volatiles. First, a diaphragm vacuum pump was used which was followed by a high-vacuum oil pump at 90° C. for one hour. A yellow viscous liquid was obtained weighing 2085 grams. The analytical properties of the enhanced oligomeric polyol (OP-4.1) are listed in TABLE 4.1.

TABLE 4.1

| POLYOL | Polyol Properties | | | | |
|---|---|---|---|---|---|
| | EOC (%) | OH# (mg KOH/g) | Acid# (mg KOH/g) | Visc. (Pa·s @ 25° C.) [cps @ 25° C.] | Oligomer (%) |
| OP-4.1 | 2.8 | 92 | 0.43 | 9.2 [9200] | 67 |

Step 2 (EOP-4.1): Preparation of Enhanced Oligomeric Polyol (EOP-4.1) by Amidation of Oligomeric Polyol (OP-4.1)

1005 grams of OP-4.1 polyol, 81 grams of diethanolamine (99% purity from Acros Organics, Geel, Belgium) and 500 mL of toluene were mixed at room temperature in a two-liter three-armed round bottom flask equipped with a water-cooled condenser, thermometer, and magnetic stir bar. After the flask was flushed with $N_2$ for 10 minutes, the contents of the flask were heated to about 125° C. while stirring. The stirring was continued and temperature maintained for a total of 22 hours. The heat source was removed and the temperature was allowed to fall to about 70° C. The contents were then transferred to another flask and placed on a rotary evaporator to remove the volatiles, first through a diaphragm vacuum pump, and then through a high-vacuum oil pump at 90° C. for 2 hours. 1046 grams of an enhanced oligomeric polyol (EOP-4.1) was obtained. The oligomeric polyol was a reddish brown viscous liquid.

Step 2 (EOP-4.2): Preparation of Enhanced Oligomeric Polyol (EOP-4.2) by Amidation of Oligomeric Polyol (OP-4.1).

930 grams of polyol OP-4.1 polyol and 75 grams of diethanolamine (99% purity from Acros Organics, Geel, Belgium) were mixed at room temperature in a two-liter three-armed round bottom flask equipped with a water-cooled condenser, thermometer, and mechanical stirrer. After the flask was flushed with $N_2$ for 10 minutes, the contents of the flask were heated to about 125° C. while stirring. The stirring was continued and temperature maintained for a total of 21 hours. The heat source was removed and the temperature was allowed to fall to about 70° C. The resulting enhanced oligomeric polyol (EOP-4.2) was a reddish brown viscous liquid which weighed 997 grams.

The analytical properties of EOP-4.1 and EOP-4.2 are listed in TABLE 4.2.

TABLE 4.2

| | EOC (%) | OH# (mg KOH/g) | Acid# (mg KOH/g) | Water Content (%) | Visc. (Pa·s @ 25° C.) [cps @ 25° C.] | Oligomer (%) | 1°-OH content meas'd (%) |
|---|---|---|---|---|---|---|---|
| EOP-4.1 | 2.7 | 188 | 0.18 | 0.084 | 17.0 [17,000] | 51 | |
| EOP-4.2 | 2.4 | 195 | 0.19 | 0.042 | 17.8 [17,800] | 54 | 34 |

Example 4.2

Preparation of Enhanced Oligomeric Polyols (EOP-4.3) by Amidation of Ethylene Glycol Ring-Opened Oligomeric Polyols Step 1: Preparation of Oligomeric Polyol (OP-4.2)

Fully epoxidized soybean oil (3,713 g) was added to a 10 L reactor equipped with a mechanical mixer, condenser, thermometer; and heating mantle. Ethylene glycol (185 g) and HBF$_4$ (48% in water, 7.5 g) were added and the mixture heated slowly to about 80° C. where it was maintained for 2 hours. The reaction mixture reached a maximum temperature of about 89° C. Lewatite MP64 (100 g) ion-exchange resin was added and was stirred for 1 hour. The mixture was then diluted with 1 gallon of acetone to help with filtration. The mixture was then filtered to remove the resin. The solvent was then removed using a rotary evaporator. The material was further dried under a high vacuum. The resulting oligomeric polyol (OP-4.2) weighed 3,791 g. Traces of residual ethylene glycol were removed using a wiped-film evaporator. The properties of oligomeric polyol OP-4.2 are shown in TABLE 4.3.

TABLE 4.3

Polyol Properties

| | EOC (%) | OH# (mg KOH/g) | Acid# (mg KOH/g) | Water content (%) | Visc. (Pa·s @ 25° C.) [cps @ 25° C.] | Oligo. Content (%) | 1°-OH content meas'd (%) |
|---|---|---|---|---|---|---|---|
| OP-4.2 | 4.3 | 70 | 0.58 | 0.001 | 19.8 [19,800] | 64 | 22 |

Step 2: Amidation of Oligomeric Polyol (OP-4.2) to form Enhanced Oligomeric Polyol (EOP-4.3)

1001 g of oligomeric polyol OP-4.2 and 40 g diethanolamine (99% purity from Acros Organics, Geel, Belgium) were mixed at room temperature in a two-liter three-armed round bottomed flask equipped with a water-cooled condenser, thermometer, and mechanical stirrer. After the flask was flushed by N$_2$ for 10-15 minutes, the content of the flask was heated to about 125° C. while stirring. The stirring was continued and temperature maintained for a total of 18 hours. The temperature was then allowed to fall to about 70° C. The resulting enhanced oligomeric polyol EOP-4.3 was a reddish brown viscous liquid and weighed 1,037 g. The properties of enhanced oligomeric polyol EOP-4.3 are shown in TABLE 4.4.

TABLE 4.4

Polyol Properties

| | EOC (%) | OH# (mg KOH/g) | Acid# (mg KOH/g) | Water content (%) | Visc. (Pa·s @ 25° C.) [cps @ 25° C.] | Oligo. Content (%) | 1°-OH content meas'd (%) |
|---|---|---|---|---|---|---|---|
| EOP-4.3 | 4.2 | 130 | 0.28 | 0.022 | 13.9 [13,900] | 60 | 43 |

EXAMPLE 5

Example 5.1

Preparation of Enhanced Oligomeric Polyol (EOP-5.1) by Amidation of Oligomeric Bodied Soybean Oil First, 700 grams of Bodied Soybean Oil and 35 grams of diethanolamine (99% purity from Acros Organics, Geel, Belgium) were added to a 1-liter three-necked round bottom flask that was equipped with a water-cooled condenser, thermometer, mechanical stirrer, and $N_2$ inlet. After flushing with $N_2$ for about 15 min, the content of the flask was heated to 125° C. and the temperature was maintained for 18 hours. The contents of the flask were then cooled to about 50° C. and were transferred out. The brown viscous liquid product weighed 732 g. Properties of the enhanced oligomeric polyol (EOP-5.1) are shown in TABLE 5.1.

TABLE 5.1

|  | I.V. | OH# (mg KOH/g) | Acid# (mg KOH/g) | Water content (%) | Visc. (Pa·s @ 25° C.) [cps @ 25° C.] | Oligomer Content (%) |
|---|---|---|---|---|---|---|
| EOP-5.1 | 88 | 71 | 0.83 | 0.046 | 4.5 [4500] | 61% |

Example 5.2

Preparation of Enhanced Oligomeric Polyol (EOP-5.2) by Amidation of Oligomeric Polyol (OP-5.1)

Step 1: Oligomeric polyol OP-5.1 was prepared from fully epoxidized soybean oil that was ring-opened by water. Properties of polyol OP-5.1 are shown in TABLE 5.2.

TABLE 5.2

Polyol Properties

| | Ring-Opener (%) | Cat. Amt. (%) | EOC (%) | OH# (mg KOH/g) | Acid# (mg KOH/g) | Water content (%) | Visc. (Pa·s @ 25° C.) [cps @ 25° C.] | Oligomer Content (%) |
|---|---|---|---|---|---|---|---|---|
| OP-5.1 | 1.5 | 0.10 | 3.8 | 89 | 0.73 | 0.007 | 14.0 [14,000] | 64 |

Step 2: First, 987 grams of ring-opened epoxidized soybean oil (OP-5.1), 50 grams of diethanolamine (Acros Organics, Geel, Belgium), and 600 mL of toluene were charged to a 2-liter three-armed round bottom flask that was equipped with a water-cooled condenser, them iometer, and magnetic stir bar. After the flask was flushed by $N_2$ for 10 minutes, the contents of the flask were heated to about 125° C. while stirring. The stirring was continued, and the temperature was maintained for a total of 20 hours. The temperature was then allowed to drop to about 70° C. and the product was transferred to a rotary evaporator to remove the volatiles. A diaphragm vacuum pump was used first followed by a high-vacuum pump at 90° C. for one hour. A reddish brown viscous liquid was obtained which weighed 996 grams. Properties of enhanced oligomeric polyol EOP-5.2 are shown in TABLE 5.3.

TABLE 5.3

| | EOC (%) | OH# (mg KOH/g) | Acid# (mg KOH/g) | Water content (%) | Visc. (Pa·s @ 25° C.) [cps @ 25° C.] | Oligo. Content (%) |
|---|---|---|---|---|---|---|
| EOP-5.2 | 3.5 | 167 | 0.23 | 0.101 | 20.0 [20,000] | 58 |

EXAMPLE 6

General Experimental Procedure for Synthesis of Enhanced Oligomeric Polyols from Oligomeric Vegetable Oils The starting materials for EXAMPLE 6 consisted of bodied linseed oil and bodied soybean oil. KCZ5/6 bodied linseed oil is commercially available from Cargill, Incorporated (Minneapolis, Minn.). Z6 bodied linseed oil is commercially available from Davis-Frost Company (Minneapolis, Minn.). The bodied linseed oil and bodied soybean oil are characterized in TABLE 6.1.

In a 450 mL stainless steel reactor were charged in the following order: bodied vegetable oil, a transesterification polyol, and a catalyst. The amount of each component is listed in TABLES 6.3-6.4. The reactor was closed and, under continuous stirring, was purged with nitrogen by continuously bubbling nitrogen for about 10 minutes. Finally, a pressure of about 10 to 15 p.s.i. of a protective inert atmosphere of nitrogen was established. The reactor was heated to 170° C. and was maintained at temperature for 4 to 6 hours as shown in TABLES 6.3-6.4. The reactor was then cooled to 60-80° C. and the polyol was discharged into a glass bottle. Properties of the enhanced oligomeric polyols are characterized in TABLES 6.5 and 6.6.

As a general observation, the polyols used for the transesterification reaction that had only primary hydroxyls (EG, DEG, PEG200, TEOA, TMP etc.) typically required a lower catalyst concentration (e.g., about 0.05-0.1%) and shorter reaction times (e.g., about 4 h). The polyols having primary and secondary hydroxyls (PG, DPG, sorbitol etc.) typically require a higher catalyst concentration (e.g., about 0.1%) and longer reaction time (e.g., about 6 h).

TABLE 6.1

| Designation | KCZ5/6 | Z6 | BSBO |
|---|---|---|---|
| Type | Bodied Linseed Oil | Bodied Linseed Oil | Bodied Soybean Oil |
| Iodine Value (mg $I_2$/g) | 100 | 89 | — |
| Viscosity (Pa·s @ 25° C.) [cps @ 25° C.] | 9.6 [9600] | 13.6 [13,600] | 6 [6000] |

TABLE 6.1-continued

| Designation | KCZ5/6 | Z6 | BSBO |
|---|---|---|---|
| Acidity (mg KOH/g) | 18 | 7.6 | — |
| Mn | 1800 | 2819 | — |
| Mw | 9750 | 18182 | — |
| Mw/Mn | 5.4 | 6.44 | — |
| Monomer Content (%) | 25 | 21 | — |
| Oligomer Content (%) | 71 | 75 | — |
| Appearance | Yellow viscous liquid | Brown viscous liquid | — |

TABLE 6.2

| Abbreviation | Chemical Compound |
|---|---|
| EG | Ethylene glycol |
| DEG | Diethylene glycol |
| PG | Propylene glycol |
| DPG | Dipropylene glycol |
| TEG | Tetraethylene glycol |
| PEG200 | Polyethylene glycol (MW = 200) |
| TMP | Trimethylolpropane |
| TEOA | Triethanolamine |
| Sorbitol | Sorbitol |
| PGL3 (Solvay) | Polyglycerol (MW = 240 Da; functionality = 5; OH# = 1166 mg KOH/g) |
| HF polyol | Polyol made by hydroformylation of soybean oil. (OH Number = 233 mg KOH/g) |
| PE polyol | Poly(diethylene glycol-adipate) (MW = 500; OH# = 225 mg KOH/g) |

TABLE 6.3

| Polyol | Oil Type | Amount of Oil | Nucleophile (g) | Catalyst (g) | Temp. (°C.) | Time (Hours) |
|---|---|---|---|---|---|---|
| 6.1 | KCZ 5/6 | 200 | EG (6.0 g) | FC 4350 (0.11 g) | 170 | 4 |
| 6.2A | KCZ 5/6 | 300 | DEG (16.8 g) | FC 4350 (0.3 g) | 170 | 4 |
| 6.2B | KCZ 5/6 | 225 | DEG (7.92 g) | FC 4350 (0.23 g) | 170 | 4 |
| 6.2C | Z6 | 225 | DEG (8.0 g) | CaH₂ (1.165 g) | 170 | 6 |
| 6.3 | Z6 | 200 | PG (7.7 g) | FC 4350 (0.2 g) | 170 | 6 |
| 6.4 | Z6 | 145 | DPG (10.3 g) | FC 4350 (0.155 g) | 170 | 6 |
| 6.5 | KCZ 5/6 | 300 | TEG (32 g) | FC 4350 (0.3 g) | 170 | 4 |
| 6.6 | Z6 | 225 | PEG200 (15 g) | FC 4350 (0.23 g) | 170 | 4 |
| 6.7 | KCZ 5/6 | 180 | TMP (8.8 g) | FC 4350 (0.2 g) | 170 | 4 |
| 6.8A | Z6 | 235 | TEOA (9.9 g) | FC 4350 (0.24 g) | 170 | 4 |
| 6.8B | Z6 | 225 | TEOA (10.4 g) | CaH2 (1.17 g) | 170 | 6 |
| 6.8C | Z6 | 225 | TEOA (7.4 g) | FC 4350 (0.23 g) | 170 | 4 |
| 6.9 | KCZ 5/6 | 200 | Sorbitol (5.1 g) | FC 4350 (0.2 g) | 170 | 6 |
| 6.10 | Z6 | 200 | PGL3 (Solvay) 10.0 g) | FC 4350 (0.23 g) | 170 | 6 |
| 6.11 | Z6 | 200 | PGL3 (16.0 g) | FC 4350 (0.23 g) | 170 | 6 |
| 6.12 | Z6 | 200 | HF polyol (36.5 g) | FC 4350 (0.23 g) | 170 | 6 |
| 6.13 | Z6 | 200 | PE polyol (38 g) | FC 4350 (0.23 g) | 170 | 6 |

TABLE 6.4

| | Oil Type | Amount of Oil (g) | Nucleophile (g) | Catalyst (g) | Temp. (°C.) | Time (Hours) |
|---|---|---|---|---|---|---|
| 6.14 | BSBO | 225 | TEOA (9.5 g) | FC4350 (0.235 g) | 170 | 4 |
| 6.15 | BSBO | 225 | DEG (7.0 g) | FC 4350 (0.23 g) | 170 | 4 |
| 6.16 | BSBO | 225 | PEG200 (24.5 g) | FC 4350 (0.25 g) | 170 | 4 |

TABLE 6.5

| | OH # (mg KOH/g) | Acid (mg KOH/g) | Visc. (Pa·s @ 25 C.) [cps @ 25° C.] | Oligomer (%) | Monomer (%) | Mn |
|---|---|---|---|---|---|---|
| 6.1 | 42 | 4.39 | 2.2 [2200] | 63 | 15 | — |
| 6.2A | 56-58 | 7.6 | 3.2 [3200] | 67 | 11 | — |
| 6.2B | 34 | 5.7 | 2.8 [2800] | 67 | — | 1790 |
| 6.2C* | 46 | 0.7 | 2.6 [2600] | — | — | 1710 |
| 6.3 | 49 | 7.5 | 3.4 [3400] | 69 | 13 | — |
| 6.4 | 56 | 8.8 | 3.2 [3200] | 65 | 13 | — |
| 6.5 | 55 | 5.8 | 2.6 [2600] | 63 | 15 | — |
| 6.6 | 36 | 5.8 | 2.3 [2300] | 66 | — | 1800 |
| 6.7 | 56 | 0.3 | 7.7 [7700] | 54 | 18 | — |
| 6.8A | 44 | 6.7 | 5.1 [5100] | 70 | 11 | — |
| 6.8B* | 57 | 1.1 | 5.8 [5800] | — | — | 2050 |
| 6.8C | 31 | 5.2 | 6.8 [6800] | 69 | — | 2084 |
| 6.9 | 42 | 10.4 | 10.6 [10,600] | 76 | 19 | — |
| 6.10 | 32 | 4.7 | 14 [14,000] | — | — | 2200 |
| 6.11 | 49 | 4.1 | 14.9 [14,900] | — | — | 2035 |
| 6.12 | 39 | 5.4 | 13.6 [13,600] | — | — | 2360 |
| 6.13 | 25 | 2.0 | 5.7 [5700] | — | — | 1800 |

*= filtered under pressure to remove solid Ca compounds

TABLE 6.6

| | OH # (mg KOH/g) | Acid Value (mg KOH/g) | Visc (Pa·s @ 25° C.) [cps @ 25° C.] | Oligomer (%) | Monomer (%) | Mn (Da) |
|---|---|---|---|---|---|---|
| 6.14 | 44 | 6.9 | 2.1 [2100] | 69 | — | 1658 |
| 6.15* | 29 | 2.3 | 1.4 [1400] | 69 | — | 1723 |
| 6.16** | 55 | 1.1 | 1.9 [1900] | 66 | — | 1635 |

*= neutralized with CaH₂
**= neutralized with dicyclohexyl carbodiimide

EXAMPLE 7

Enhanced Oligomeric Polyols from Triethanolamine:

Example 7.1

Oligomerized soybean oil from Cargill (7578 grams, 11,470 cp), triethanol amine (219 grams, Dow), and FasCat 4350 (7.8 g, Arkema) were charged to a 12-Liter round bottom flask equipped with an agitator, thermocouple, temperature controller and heating mantle. The reaction mixture was heated to 90-95° C. and degassed by applying vacuum and breaking to nitrogen. The reaction was then heated to 170° C. Viscosity decreased throughout the reaction, which was stopped when the viscosity leveled off. The unfiltered amber product was bright and clear. Product properties are shown in TABLE 7.1.

Example 7.2

This synthesis was conducted by the procedure described in Example 7.1 using oligomerized soybean oil (7579 grams), triethanol amine (446 grams), and FasCat 4350 (8.0 g). The unfiltered amber product was bright and clear. Product properties are shown in TABLE 7.1.

Enhanced Oligomeric Polyols from Tetraethylene Glycol (PEG 200):

Example 7.3

Oligomerized soybean oil from Cargill (2302 grams, 11,470 cp), PEG 200 (199 grams, Dow), and FasCat 4350 (2.5 grams, Arkema) were charged to a 5-Liter round bottom flask equipped with an agitator, thermocouple, temperature controller and heating mantle. The reaction mixture was heated to 90-95° C. and degassed by applying vacuum and breaking to nitrogen. The reaction was then heated to 170° C. and held at 170° C. for 6 hours, after which it was allowed to cool to room temperature. The unfiltered amber product was bright and clear. Product properties are shown in TABLE 7.1.

Example 7.4

This synthesis was conducted by the procedure described in Example 7.3 using oligomerized soybean oil (2236 grams), PEG 200 (266 grams), and FasCat 4350 (2.5 grams) and a 4.5 hour reaction time. The unfiltered amber product was bright and clear. Product properties are shown in TABLE 7.1.

Example 7.5

This synthesis was conducted by the procedure described in Example 7.3 using oligomerized soybean oil (2168 grams), PEG 200 (334 grams), and FasCat 4350 (2.5 g) and a 4.5 hour reaction time. The unfiltered amber product was bright and clear. Product properties are shown in TABLE 7.1.

EXAMPLE 8

Preparation and Testing of Polyurethane Foams Comprising Enhanced Oligomeric Polyols Materials List Polyol F3022—a petroleum-derived, nominal 3000 molecular weight triol having a hydroxyl number of 54.3 mg KOH/g and an acid number of 0.03 mg KOH/gram (commercially available under the trade designation "ARCOL F-3022" from Bayer).

Amine BL11—a blowing catalyst consisting of 70% bis (dimethylaminoethyl)ether and 30% dipropylene glycol (commercially available under the trade designation "DABCO BL-11" from Air Products).

Tin K29—stannous octoate catalyst (commercially available from Degussa).

Silicone BF-2370—silicone surfactant (from Goldschmidt).

TDI—toluene diisocyanate.

Foams comprising the enhanced oligomeric polyols of the invention were prepared and tested as described below.

Foam Preparation Procedure:

A-Side Preparation

The formulation required amount of TDI was weighed out into a 50 ml plastic beaker and was set near the mixing station.

B-Side Preparation

A 400 ml plastic beaker was positioned on an electric scale. Next, the formulation required amount of polyol(s) were added to the beaker. Next, the formulation required amount of silicone surfactant and amine catalyst were added to the beaker. Next, the formulation required amount of tin catalyst and water were added to the batch. The temperature of the B-side was adjusted so that upon mixing with the polyisocyanate the combined mixture had a temperature of 19.2°±0.3° C. The batch was mixed with an electric, lab duty mixer (Delta ShopMaster brand, Model DP-200, 10 inch shop drill press) equipped with a 2" mixing blade (ConnBlade Brand, Model ITC from Conn Mixers Co.) for 19 seconds at 2340 rpm.

Preparation of Polyurethane Foam

The A-side was then added to the B-side and the combined formulation was mixed for 6 seconds. Following this, the mixture was poured into an 83 ounce cup and was allowed to free rise. The foam and cup were then placed into a temperature-controlled oven at 100° C. for 15 minutes to cure. At the end of the oven cure, the foam was permitted to cure overnight. After curing overnight, the foam was conditioned for 72 hours at 25° C. and 50% relative humidity before testing

TABLE 7.1

| | | Reaction | | | Product | | | |
| --- | --- | --- | --- | --- | --- | --- | --- | --- |
| Example | Reactant | Weight ratio Olig. SBO/Reactant | Time (hours) | OH#[1] (mg KOH/g) | Viscosity Pa · s @ 25° C. [cps @ 25° C.] | Mn[2] | Acid Value | Gardner Color |
| 7.1 | triethanol amine | 34.7 | 5½ | 33.3 | 6.56 [6560] | 2131 | 1.6 | 5.5 |
| 7.2 | triethanol amine | 17.0 | 4 | 67 | 4.04 [4040] | 1611 | 1.8 | 6.0 |
| 7.3 | PEG 200 | 11.6 | 6½ | 44 | 2.81 [2810] | 1602 | 0.8 | 6.0 |
| 7.4 | PEG 200 | 8.4 | 4½ | 61 | 2.12 [2120] | 1407 | 0.9 | 6.0 |
| 7.5 | PEG 200 | 6.5 | 4½ | 74 | 1.55 [1550] | 1213 | 0.9 | 6.0 |

[1] ASTM E1899
[2] Gel Permeation Chromatography using polystyrene standards for physical properties. The foam formulations and physical property test data are reported in TABLES 8.1-8.2.

TABLE 8.1

|  | 6.14* | 6.14* | 6.15 | 6.15 | 6.16 | 6.16 | 6.3 | 6.3 | 6.13** | 5.1.2** |
|---|---|---|---|---|---|---|---|---|---|---|
| Enhanced Oligomeric Polyol | | | | | | | | | | |
| OH# (mg KOH/g) | 44.4 | 44.4 | 28.8 | 28.8 | 54.6 | 54.6 | 49.3 | 49.3 | 52.2 | 52.2 |
| Water (%) | 0.02 | 0.02 | 0.04 | 0.04 | 0.04 | 0.04 | 0.08 | 0.08 | 0.06 | 0.06 |
| Acid # (mg KOH/g) | 7.1 | 7.1 | 2.3 | 2.3 | 1.6 | 1.6 | 7.5 | 7.5 | 5.8 | 5.8 |
| Viscosity (Pa·s @ 25° C.) [cps @ 25° C.] | 2.1 [2100] | 2.1 [2100] | 1.4 [1400] | 1.4 [1400] | 1.9 [1900] | 1.9 [1900] | 3.4 [3400] | 3.4 [3400] | 2.8 [2800] | 2.8 [2800] |
| Foam Formulation | | | | | | | | | | |
| Arcol F-3022 (pph) | 70 | 60 | 70 | 60 | 70 | 60 | 70 | 60 | 70 | 60 |
| EOP (pph) | 30 | 40 | 30 | 40 | 30 | 40 | 30 | 40 | 30 | 40 |
| Water (pph) | 3.97 | 3.98 | 3.97 | 3.97 | 3.97 | 3.97 | 3.96 | 3.95 | 3.96 | 3.96 |
| TDI Index | 105 | 105 | 105 | 105 | 105 | 105 | 105 | 105 | 105 | 105 |
| Silicone BF-2370 (pph) | 1 | 1 | 1 | 1 | 1 | 1 | 1 | 1 | 1 | 1 |
| Amine BL-11 (pph) | 0.16 | 0.16 | 0.16 | 0.16 | 0.16 | 0.16 | 0.16 | 0.16 | 0.16 | 0.16 |
| Tin K-29 (pph) | 0.22 | 0.22 | 0.22 | 0.22 | 0.22 | 0.22 | 0.22 | 0.22 | 0.22 | 0.22 |
| Foam Properties | | | | | | | | | | |
| Density (lbs/ft$^3$) | 1.63 | 1.63 | 1.6 | 1.63 | 1.59 | 1.64 | 1.69 | 1.63 | 1.63 | 1.62 |
| Resiliency (%) | 33.0 | 31.0 | 33.3 | 33.0 | 33.0 | 31.7 | 33.0 | 31.7 | 35.7 | 32.7 |
| 25% IFD (N) | 33.75 | 34.00 | 29.77 | 28.98 | 31.68 | 29.49 | 36.48 | 32.30 | 32.67 | 29.67 |
| 65% IFD (N) | 62.75 | 66.09 | 56 | 55.58 | 52.24 | 64 | 67.58 | 62.39 | 61.98 | 57.99 |
| Support Factor | 1.86 | 1.94 | 1.88 | 1.92 | 1.65 | 2.17 | 1.85 | 1.93 | 1.9 | 1.95 |
| Tensile (kPa) | 114 | 100 | 110 | 83 | 80 | 48 | 117 | 90 | 116 | 102 |
| Elongation (%) | 147 | 129 | 171 | 114 | 92 | 59 | 162 | 123 | 175 | 152 |
| Tear (N/m) | 350 | 370 | 363 | 308 | 248 | 148 | 353 | 295 | 435 | 330 |
| Perm (ft$^3$/min) | 3.92 | 3.75 | 4.17 | 4.08 | 4.50 | 3.61 | 2.89 | 4.19 | 3.61 | 4.67 |
| 90% Compression Set | 35.9 | 26.9 | 54.9 | 22.3 | 28.6 | 27.1 | 30.1 | 32.5 | 25.3 | 29.5 |

*Synthesis similar to Example 6.14
**Synthesis similar to Example 6.13

TABLE 8.2

|  |  | 6.9 | 6.9 | 6.7* | 6.7* | 6.2C** | 6.2C** | 6.8A | 6.8A | 6.5*** | 6.5*** |
|---|---|---|---|---|---|---|---|---|---|---|---|
| Enhanced Oligomeric Polyol | | | | | | | | | | | |
| OH# (mg KOH/g) | | 42.3 | 42.3 | 39.3 | 39.3 | 48.5 | 48.5 | 44.3 | 44.3 | 56.6 | 56.6 |
| Water (%) | | 0.02 | 0.02 | 0.02 | 0.02 | 0.02 | 0.02 | 0.02 | 0.02 | 0.02 | 0.02 |
| Acid # (mg KOH/g) | | 10.6 | 10.6 | 0.3 | 0.3 | 6.2 | 6.2 | 6.7 | 6.7 | 7.3 | 7.3 |
| Foam Formulation | | | | | | | | | | | |
| Arcol F-3022 (pph) | 100 | 80 | 70 | 80 | 70 | 80 | 70 | 80 | 70 | 80 | 70 |
| EOP (pph) | 0 | 20 | 30 | 20 | 30 | 20 | 30 | 20 | 30 | 20 | 30 |
| Water (pph) |  | 3.98 | 3.98 | 3.98 | 3.98 | 3.98 | 3.98 | 3.98 | 3.98 | 3.98 | 3.98 |
| TDI Index | 105 | 105 | 105 | 105 | 105 | 105 | 105 | 105 | 105 | 105 | 105 |
| Silicone (pph) | 1 | 1 | 1 | 1 | 1 | 1 | 1 | 1 | 1 | 1 | 1 |
| Amine cat. (pph) | 0.16 | 0.16 | 0.16 | 0.16 | 0.16 | 0.16 | 0.16 | 0.16 | 0.16 | 0.16 | 0.16 |
| Tin cat. (pph) | 0.22 | 0.17 | 0.14 | 0.22 | 0.22 | 0.18 | 0.16 | 0.17 | 0.145 | 0.18 | 0.165 |
| Foam Properties | | | | | | | | | | | |
| Density (lbs/ft$^3$) | 1.50 | 1.56 | 1.55 | 1.57 | 1.61 | 1.52 | 1.56 | 1.51 | 1.49 | 1.49 | 1.54 |
| Resiliency (%) | 40.2 | 37.3 | 34.3 | 38.3 | 35.5 | 37.8 | 34.5 | 35.5 | 35 | 37.2 | 35.5 |
| 25% IFD (N) | 22.53 | 30.60 | 32.06 | 22.15 | 21.87 | 25.36 | 26.20 | 31.05 | 30.42 | 24.24 | 25.45 |
| 65% IFD (N) | 39.60 | 55.35 | 57.87 | 46.115 | 51.43 | 45.32 | 48.84 | 53.95 | 55.19 | 44.31 | 46.23 |
| Support Factor | 1.76 | 1.81 | 1.81 | 2.08 | 2.35 | 1.79 | 1.86 | 1.74 | 1.81 | 1.82 | 1.81 |
| Tensile (kPa) | 128 | 117 | 108 | 58 | 30 | 113 | 101 | 143 | 136 | 114 | 102 |
| Elongation (%) | 250 | 149 | 116 | 92 | 59 | 201 | 172 | 210 | 173 | 216 | 180 |
| Tear (N/m) | 482 | 298 | 240 | 206 | 132 | 406 | 367 | 415 | 384 | 424 | 414 |
| Perm (ft$^3$/min) | 3.48 | 2.19 | 2.31 | 3.84 | 1.86 | 3.23 | 2.82 | 1.51 | 2.09 | 2.28 | 2.58 |
| 90% Compression Set | 29.0 | 25.8 | 17.9 | 23.8 | 10.4 | 27.7 | 13.9 | 77.2 | 24.8 | 75.4 | 71.7 |

*Synthesis similar to example 6.7
**Synthesis similar to example 6.2C
***Synthesis similar to example 6.5

Other embodiments of this invention will be apparent to those skilled in the art upon consideration of this specification or from practice of the invention disclosed herein. Variations on the embodiments described herein will become apparent to those of skill in the relevant arts upon reading this description. The inventors expect those of skill to use such variations as appropriate, and intend to the invention to be practiced otherwise than specifically described herein. Accordingly, the invention includes all modifications and equivalents of the subject matter recited in the claims as permitted by applicable law. All patents, patent documents, and publications cited herein are hereby incorporated by reference as if individually incorporated. In case of conflict, the present specification, including definitions, will control.

What is claimed is:

1. A method of making an enhanced oligomeric polyol, comprising:
   (a) providing a natural oil comprising glycerol fatty acid ester bonds;
   (b) anaerobically heating the natural oil so that it oligomerizes to form an anaerobically thermally oligomerized natural oil; and
   (c) amidating the anaerobically thermally oligomerized natural oil to cleave at least a portion of the glycerol fatty acid ester bonds to form the enhanced oligomeric polyol.

2. The method of claim 1, wherein the amidation is conducted with a monoamine, diamine, polyamine, alkanolamine, or a mixture thereof.

3. The method of claim 2, wherein the amidation is conducted with a polyamine.

4. The method of claim 3, wherein the polyamine has the formula:

$$H_2N-R-NH_2$$

where R is an aliphatic group or aromatic group.

5. The method of claim 3, wherein the polyamine is a polyalkylene glycol diamine.

6. The method of claim 5, wherein the polyalkylene glycol diamine is a polybutylene glycol diamine, a polypropylene glycol diamine, a polyethylene glycol diamine, and mixtures thereof.

7. The method of claim 3, wherein the polyamine is an amine-terminated polypropylene glycol diamine.

8. The method of claim 7, wherein the amine-terminated polypropylene glycol diamine is represented by the formula:

$$H2N-[-CH(-CH3)-CH2-O-]x-CH2-CH(-CH3)-NH2$$

where x ranges from about 2 to about 70.

9. The method of claim 8, wherein the amine-terminated polypropylene glycol diamine has a molecular weight ranging from about 200 Da to about 4000 Da.

10. The method of claim 3, wherein the polyamine is a polyethylene glycol diamine.

11. The method of claim 5, wherein the polyalkylene glycol diamine is represented by the formula:

$$H_2N-CH(-CH_3)-CH_2-[-O-CH_2-CH(-CH_3)-]_x-[O-CH_2-CH_2-]_y-[-O-CH_2-CH(-CH_3)-]_z-NH_2$$

where y is about 2 to about 40;
(x+z) is about 1 to about 6; and
the molecular weight of the diamine ranges from about 200 to about 2000 Da.

12. The method of claim 3, wherein the polyamine is represented by the formula:

$$H_2N-(CH_2)x-O-CH_2-CH_2-O-(CH_2)x-NH_2$$

where x ranges from about 2 to 3; and
the molecular weight ranges from about 140 to about 180 Da.

* * * * *